(12) United States Patent
Rostami et al.

(10) Patent No.: US 11,493,454 B2
(45) Date of Patent: Nov. 8, 2022

(54) SYSTEM AND METHOD FOR DETECTING DEFECTS ON A SPECULAR SURFACE WITH A VISION SYSTEM

(71) Applicant: Cognex Corporation, Natick, MA (US)

(72) Inventors: Fariborz Rostami, Menlo Park, CA (US); John F. Filhaber, East Haddam, CT (US); Feng Qian, Framingham, MA (US)

(73) Assignee: Cognex Corporation, Natick, MA (US)

( * ) Notice: Subject to any disclaimer, the term of this patent is extended or adjusted under 35 U.S.C. 154(b) by 0 days.

(21) Appl. No.: 15/349,131

(22) Filed: Nov. 11, 2016

(65) Prior Publication Data

US 2017/0236266 A1    Aug. 17, 2017

Related U.S. Application Data

(60) Provisional application No. 62/404,431, filed on Oct. 5, 2016, provisional application No. 62/274,094, filed
(Continued)

(51) Int. Cl.
   *G02B 3/06*   (2006.01)
   *G01N 21/95*  (2006.01)
   (Continued)

(52) U.S. Cl.
   CPC ......... *G01N 21/95* (2013.01); *G01N 21/8806* (2013.01); *G02B 5/005* (2013.01);
   (Continued)

(58) Field of Classification Search
   CPC ............... G01N 21/95; G01N 21/8806; G01N 2021/8848; G01N 2021/9513;
   (Continued)

(56) References Cited

U.S. PATENT DOCUMENTS

| 4,272,186 A | 6/1981 | Plummer |
| 4,891,529 A | 1/1990 | Braun et al. |

(Continued)

FOREIGN PATENT DOCUMENTS

| JP | 61176805 A | 8/1986 |
| JP | 03115844 A | 5/1991 |

(Continued)

*Primary Examiner* — Patrick E Demosky
(74) *Attorney, Agent, or Firm* — Loginov & Associates, PLLC; William A. Loginov

(57) ABSTRACT

This invention provides a system and method for detecting and imaging specular surface defects on a specular surface that employs a knife-edge technique in which the camera aperture or an external device is set to form a physical knife-edge structure within the optical path that effectively blocks reflected rays from an illuminated specular surface of a predetermined degree of slope values and allows rays deflected at differing slopes to reach the vision system camera sensor. The light reflected from the flat part of the surface is mostly blocked by the knife-edge. Light reflecting from the sloped parts of the defects is mostly reflected into the entrance aperture. The illumination beam is angled with respect to the optical axis of the camera to provide the appropriate degree of incident angle with respect to the surface under inspection. The surface can be stationary or in relative motion with respect to the camera.

21 Claims, 22 Drawing Sheets

Related U.S. Application Data on Dec. 31, 2015, provisional application No. 62/255,360, filed on Nov. 13, 2015.

(51) Int. Cl.
  *H04N 5/225* (2006.01)
  *G02B 5/00* (2006.01)
  *G01N 21/88* (2006.01)

(52) U.S. Cl.
  CPC ... *H04N 5/2256* (2013.01); *G01N 2021/8848* (2013.01); *G01N 2021/9513* (2013.01)

(58) Field of Classification Search
  CPC .... G01N 21/9501; G01N 21/956; G02B 3/06; G02B 5/005; G02B 5/3083; G02B 27/10; G02B 27/286; H04N 5/2256
  See application file for complete search history.

(56) References Cited

U.S. PATENT DOCUMENTS

| | | | |
|---|---|---|---|
| 5,058,178 A | 10/1991 | Ray | |
| 5,389,794 A | 2/1995 | Allen et al. | |
| 5,562,788 A | 10/1996 | Kitson et al. | |
| 5,745,236 A * | 4/1998 | Haga | G01N 21/8806 356/237.1 |
| 5,835,207 A * | 11/1998 | Sugiura | G01M 11/0221 356/124 |
| 6,166,393 A | 12/2000 | Paul et al. | |
| 6,809,809 B2 | 10/2004 | Kinney et al. | |
| 6,956,658 B2 | 10/2005 | Meeks et al. | |
| 7,126,699 B1 * | 10/2006 | Wihl | G01B 11/0608 356/625 |
| 9,404,872 B1 * | 8/2016 | Wang | G01N 21/9501 |
| 2003/0110610 A1 | 6/2003 | Duquette et al. | |
| 2007/0008538 A1 * | 1/2007 | Kiraly | G01N 21/8903 356/430 |
| 2008/0055592 A1 * | 3/2008 | Nakamura | G02B 21/086 356/239.2 |
| 2008/0100829 A1 | 5/2008 | Watson | |
| 2008/0303913 A1 | 12/2008 | Mertens | |
| 2009/0025480 A1 * | 1/2009 | Aharoni | G01H 9/00 73/655 |
| 2010/0091272 A1 * | 4/2010 | Asada | G01N 21/255 356/237.2 |
| 2010/0201806 A1 | 8/2010 | Nygaard et al. | |
| 2010/0245850 A1 | 9/2010 | Lee et al. | |
| 2011/0317156 A1 * | 12/2011 | Lee | G01N 21/8901 356/237.2 |
| 2013/0188026 A1 * | 7/2013 | Hiramoto | G03B 35/10 348/49 |
| 2013/0223673 A1 | 8/2013 | Davis et al. | |
| 2014/0052555 A1 | 2/2014 | MacIntosh | |
| 2014/0267688 A1 | 9/2014 | Aich et al. | |
| 2016/0238631 A1 * | 8/2016 | Aharoni | G01Q 20/02 |
| 2017/0212611 A1 * | 7/2017 | Thomas | G06F 3/0386 |

FOREIGN PATENT DOCUMENTS

| | | |
|---|---|---|
| JP | 2000509150 A | 7/2000 |
| JP | 2009092426 A | 4/2009 |
| WO | 02016865 A2 | 2/2002 |
| WO | 2015075723 A2 | 5/2015 |

* cited by examiner

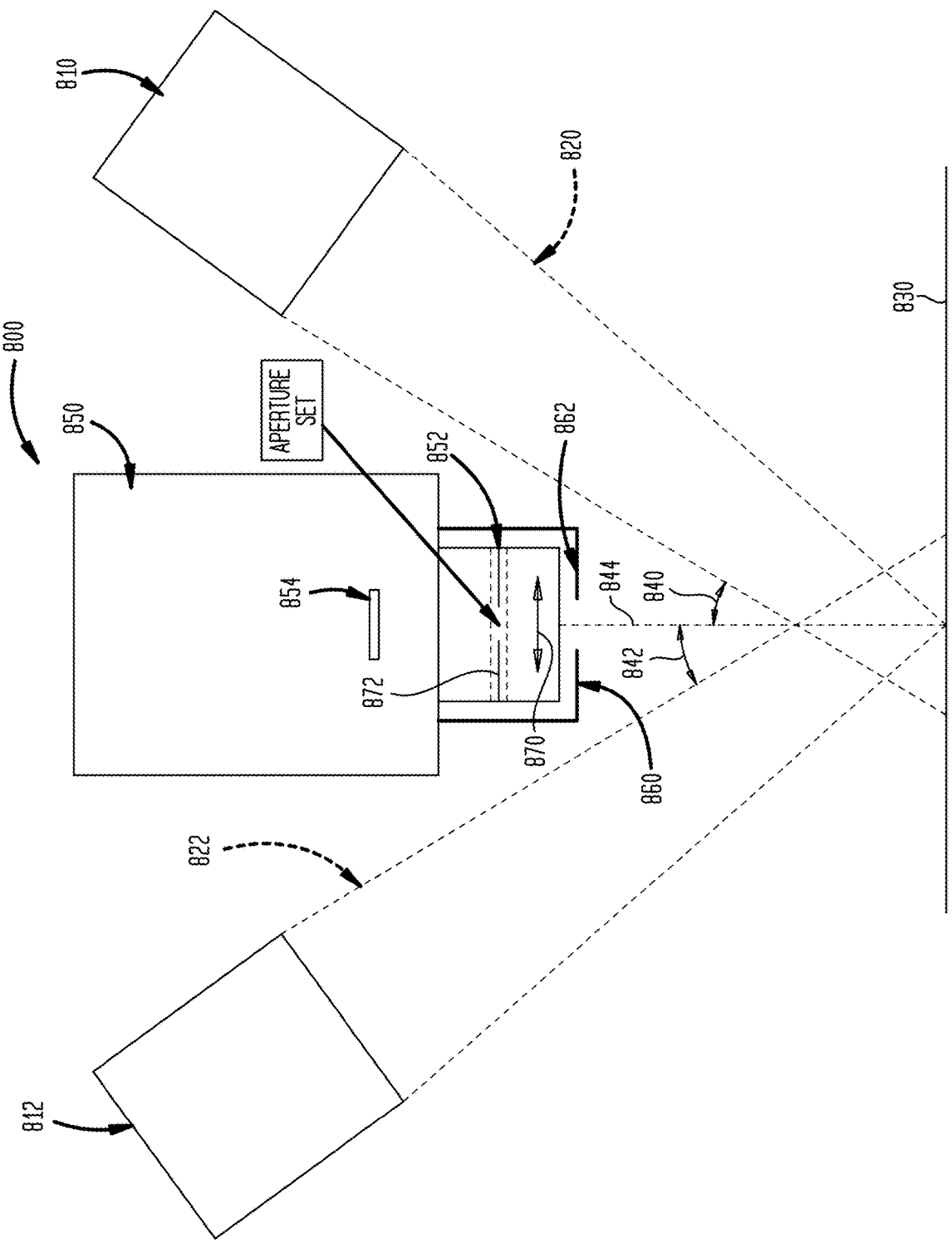

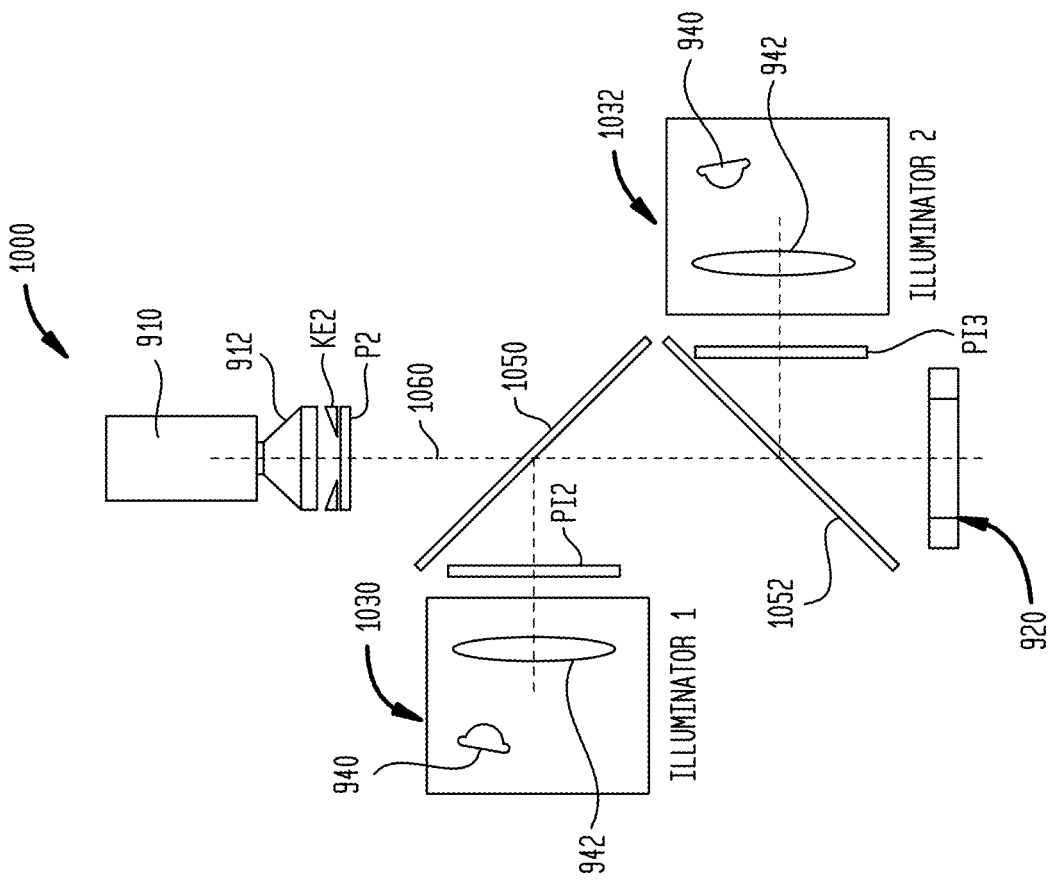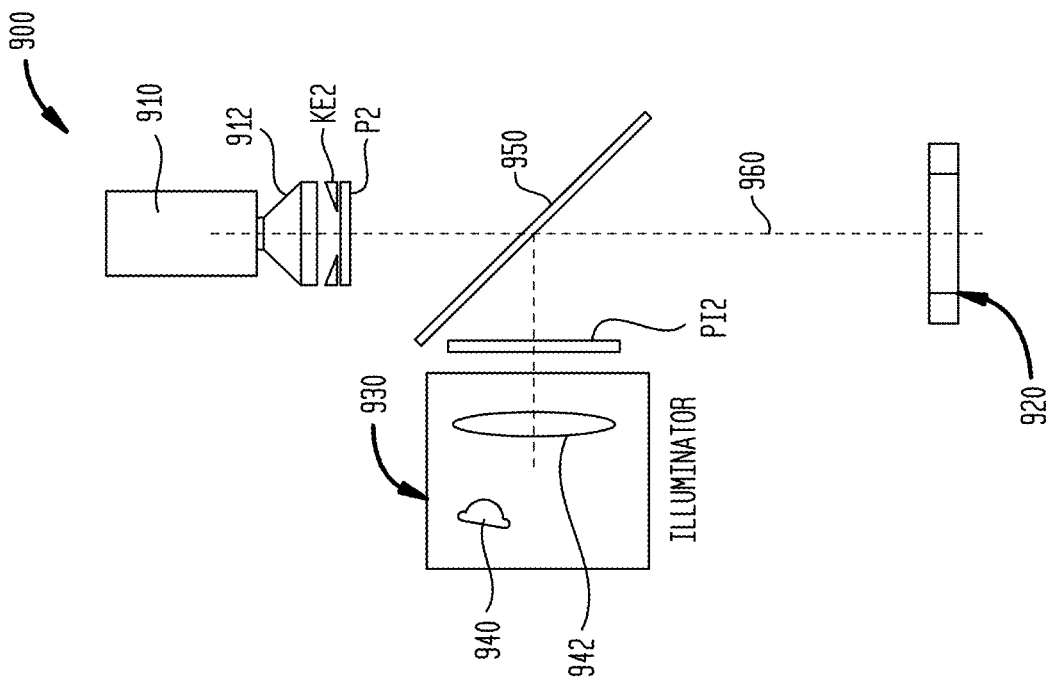

2800

SYSTEM AND METHOD FOR DETECTING DEFECTS ON A SPECULAR SURFACE WITH A VISION SYSTEM

RELATED APPLICATION

This application claims the benefit of U.S. Provisional Application, Ser. No. 62/255,360, entitled SYSTEM AND METHOD FOR DETECTING DEFECTS ON A SPECULAR SURFACE WITH A VISION SYSTEM, filed Nov. 13, 2015, U.S. Provisional Application, Ser. No. 62/274,094, entitled SYSTEM AND METHOD FOR DETECTING DEFECTS ON A SPECULAR SURFACE WITH A VISION SYSTEM, filed Dec. 31, 2015, and U.S. Provisional Application, Ser. No. 62/404,431, entitled SYSTEM AND METHOD FOR DETECTING DEFECTS ON A SPECULAR SURFACE WITH A VISION SYSTEM, filed Oct. 5, 2016, the teachings of each of which applications is expressly incorporated herein by reference.

FIELD OF THE INVENTION

This invention relates to machine vision systems for inspecting surfaces of objects and more particularly to vision systems that inspect specular surfaces.

BACKGROUND OF THE INVENTION

Machine vision systems, also termed "vision systems" herein, are used to perform a variety of tasks in a manufacturing environment. In general, a vision system consists of one or more cameras with an image sensor (or "imager") that acquires grayscale or color images of a scene that contains an object under manufacture. Images of the object can be analyzed to provide data/information to users and associated manufacturing processes. The data produced by the image is typically analyzed and processed by the vision system in one or more vision system processors that can be purpose-built, or part of one or more software application(s) instantiated within a general purpose computer (e.g. a PC, laptop, tablet or smartphone). Some types of tasks performed by the vision system can include inspection of objects and surfaces on a stationary or moving surface (conveyance), such as conveyor or motion stage.

Performing surface inspection on objects with a specular surface finish can prove challenging for a vision system. In general, reflections from the surface can cause defects and surface imperfections (e.g. small craters/valleys and/or bumps/hills), which represent a small difference in slope over a small area relative to the surrounding surface, to appear washed out by the large volume of reflected light entering the camera. One technique for attempting to find surface imperfections on a specular surface is through the use of dark field lighting in which the illumination light projected on the object is not collected at the objective lens. This serves to highlight any surface imperfections that scatter light. However, this technique has limitations in terms of setup and use in e.g. an environment that includes relative motion between the object and the camera assembly.

SUMMARY OF THE INVENTION

This invention overcomes disadvantages of the prior art by providing a system and method for detecting and imaging specular surface defects on a specular surface that employs a knife-edge technique in which the camera aperture or an external device is set to form a physical knife-edge structure within the optical path that effectively blocks reflected rays from an illuminated specular surface of a predetermined degree of slope values and allows rays deflected at differing slopes to reach the vision system camera sensor. In an embodiment, the illumination is condensed by optics so as to exit the illuminator at an area greater than the region of the surface under inspection and converge onto the region of the surface. The light is reflected by the (specular) region and continues converging to a spot either near the entrance aperture of the camera, or on the aperture stop (e.g. adjustable iris) inside the camera. At either location, the light reflected from the flat part of the surface is mostly blocked by the knife-edge or aperture stop. The light reflecting from the sloped parts of the defects is, conversely, mostly reflected into the entrance aperture. The illumination beam is angled with respect to the optical axis of the camera to provide the appropriate degree of incident angle with respect to the surface under inspection. Illustratively, the illuminator can include a linear polarizer that transmits polarized light to the surface of the object. The object can be multi-layered, and include (e.g. polarizing layers). The polarized light is reflected from the surface and into a crossed polarizer at the camera sensor/camera optics. Illustratively, the surface can be stationary and acquired by a 2D sensor array or the surface can be in relative motion with respect to the camera, which can define a line scan camera line scan sensor.

In an illustrative embodiment, a system and method for imaging defects on a specular surface of an object is provided. The surface is imaged by a vision system camera having an image sensor and optics and defining an optical axis. An illuminator assembly projecting a structured light beam onto the surface at a predetermined angle that is non-parallel to the optical axis. A knife-edge element is associated with the optics, which variably occludes part of the maximum field of view of the optics. The knife-edge element and the predetermined angle are each set so that light reflected through the optics onto the sensor is substantially transmitted from sloped hills and valleys or ripples and waviness of defect features on the surface and reflected light surrounding the sloped defect features is occluded by the knife-edge element. Illustratively, the knife-edge element comprises a variable aperture in the optics and the predetermined angle is associated with a slope of surface deformities from a flat surface. In embodiments, the sensor is a 2D sensor and the object is stationary with respect to the camera. Alternatively, the sensor defines a line scan camera arrangement and the object is in motion with respect to the camera, and the illuminator assembly projects a line of illumination onto the surface. The use of a line illuminator allows inspection of moving parts and the inspection of parts much larger than the field covered by a single image from a 2D sensor. In embodiments, the illumination in addition to visible light, substantially defines an IR or near-IR wavelength range and the object can define layers including an anti-reflective coating and/or a polarizing layer—in which case the illumination can be polarized and the optics includes a polarized filter. By way of non-limiting example, the object can be an AMOLED display and the polarizing layer is a $\frac{1}{4}\lambda$ retarder and the polarized filter defined a crossed polarized filter. The illuminator can include a polarizer to polarized illumination and the optics includes a polarizing filter. The illumination source can define a condensed beam that converges toward a point near the knife-edge structure. The knife-edge structure can define an external structure positioned in an optical path ahead of the optics (between the optics and the object). Illustratively, the illuminator assembly projects light through a beam splitter residing on an optical axis of the vision system camera so that off-axis illumination from the illuminator assembly is projected onto the object surface coincident with the optical axis. In another embodiment, the illuminator assembly defines a plurality of illumination sources, each projecting a light into a respective beam splitter, each beam splitter residing on an optical axis of the vision system camera, so that off-axis illumination from each of the illumination sources is projected by each of the beam splitters, respectively, onto the object surface coincident with the optical axis.

Illustratively, the knife edge element can define an occulting structure within the optics located on the optical axis. The occulting structure resides on a mask member provided adjacent to a front of the optics. The occulting structure can be arranged to selectively enhance or suppress scattered light associated with the features. The occulting structure can define a line extending across the optics in an elongation direction, and can have a width in a direction transverse to the direction of elongation that is relative to a size of a focused illumination spot on the optics. The direction of elongation can be defined by an orientation of the features. The mask member can include a surrounding opaque region on each of opposing sides of the line with a linear aperture between the line and the opaque region. The occulting structure can comprise a circular disk approximately centered on the optical axis, having a diameter that is relative to a size of one or more of the features. An annular region can surround the disk, and define an annular aperture between the disk and the inner perimeter of the annular region. The annular region can be arranged to suppress scattered light. Illustratively, the mask member can defines at least one of a snap-on or screw-on lens cover, an applique placed over the front of the optics and a variable-pattern, electro-optical mechanism located on the optics. In embodiments, the arrangement can include a first polarizer located in conjunction with the optics and a second polarizer located in conjunction with the illuminator assembly.

BRIEF DESCRIPTION OF THE DRAWINGS

The invention description below refers to the accompanying drawings, of which:

FIG. 8 is a side view of a vision system arrangement and exemplary scanned object showing a plurality of illumination sources and an associated knife-edge assembly according to a further embodiment;

FIGS. 9 and 10 are diagrams of a vision system operating in accordance with the description of FIG. 1, including a beam splitter to provide off-axis illumination coincident with an optical axis of the camera, employing one illuminator and two illuminators, respectively;

DETAILED DESCRIPTION

I. System Overview

Figure 1:
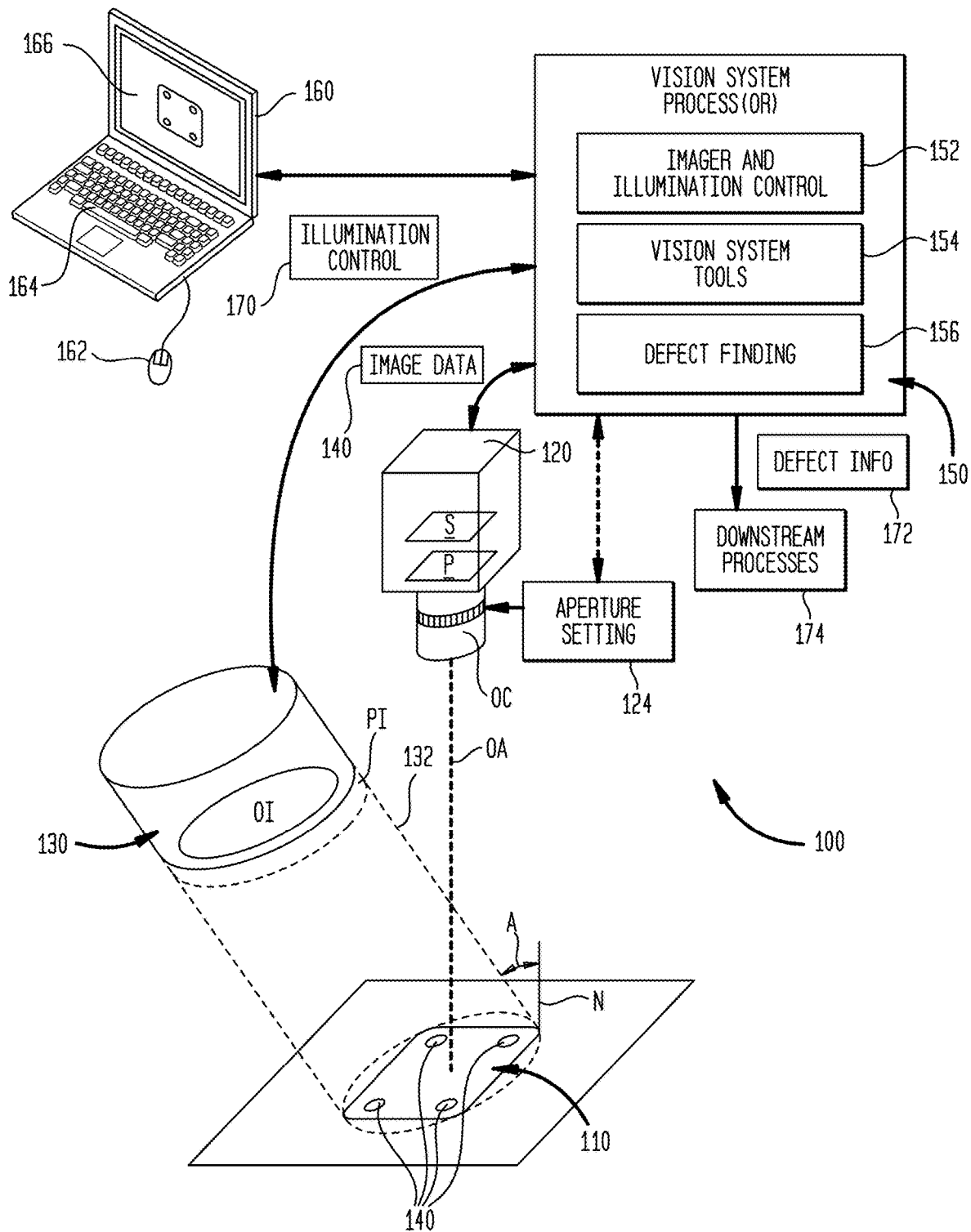
FIG. 1 is a diagram of an exemplary vision system with a camera having a 2D pixel array, acquiring an image of exemplary stationary object surface with defects, including an illuminator and aperture control arranged to resolve surface deformity defect features on a specular surface thereof.

FIG. 1 is a diagram of an exemplary vision system arrangement 100 according to an illustrative embodiment in which the scene contains a stationary, specular object 110 located with respect to a stationary vision system camera 120. In this embodiment, the vision system camera 120 includes a two-dimensional (2D) image sensor S comprising an N×M array of pixels in an (e.g.) rectangular arrangement. The camera includes an optics package OC that can comprise any acceptable lens assembly (e.g. a lens with a C-mount, F-mount or M12 base). In this embodiment, the lens includes a manual or automated aperture control—for example a variable iris—in which the user or another external controller can input an appropriate aperture setting 124 (as described further below). The sensor S and optics OC collectively define an optical axis OA that is generally normal to the generalized surface plane of the object 110. The arrangement 100 includes an illuminator, 130 that projects a collimated (e.g. by optics OI) beam 132 of light onto the surface 110. The beam 132 is adapted to maintain largely on the object and avoid extending the remaining scene in an embodiment. The beam 132 is oriented at an angle A with respect to the generalized plane of the specular surface of the object 110. This angle is non-perpendicular (typically acute) to the plane normal N. The normal N is generally parallel to the camera optical axis OA.

As shown, the surface of the object 110 includes defect features 140 that can define downwardly involute valleys (also termed "craters") or upwardly projecting hills (also termed "bumps") that are effectively imaged using the arrangement and techniques described below. Image data 140 from the illuminated scene and object 110 is transmitted to the vision system processor 150 in an illustrative embodiment. The processor 150 can be integrated directly into in one or more of the camera assemblies, or as depicted, can be located on a separate computing device 160 having appropriate user interface (e.g. mouse 162, keyboard 164) and display functions (screen and/or touchscreen 166). The computing device 160 can comprise a server, PC, laptop, tablet, smartphone or purpose-built processing device, among other types of processors with associated memory, networking arrangements, data storage, etc., that should be clear to those of skill.

The vision system process(or) 150 can include a variety of functional software processes and modules. The processes/modules can include controllers 152 for the various parameters of the camera/sensor and the illuminator 130 (via illumination control information 170. The vision system process(or) 150 also includes various vision tools 152, such as feature detectors (e.g. edge detectors, corner detectors, blob tools, etc.). These tools are used to analyze surface features of the image and locate (e.g.) the defect features 140 under illumination and optical conditions described below. The vision system processor also includes a defect finder/finding module 156 that employs the various tools 154 to locate and identify defects on the surface. The defects can be quantified and appropriate information 172 can be transmitted to handling processes (e.g. part reject and alert processes) 174.

As described further below, the camera 120 can include (within the optical path) a polarizing filter P in various embodiments. Another filter PI can be provided on the illuminator so as to deliver a polarized light beam onto the surface.

Figure 2:
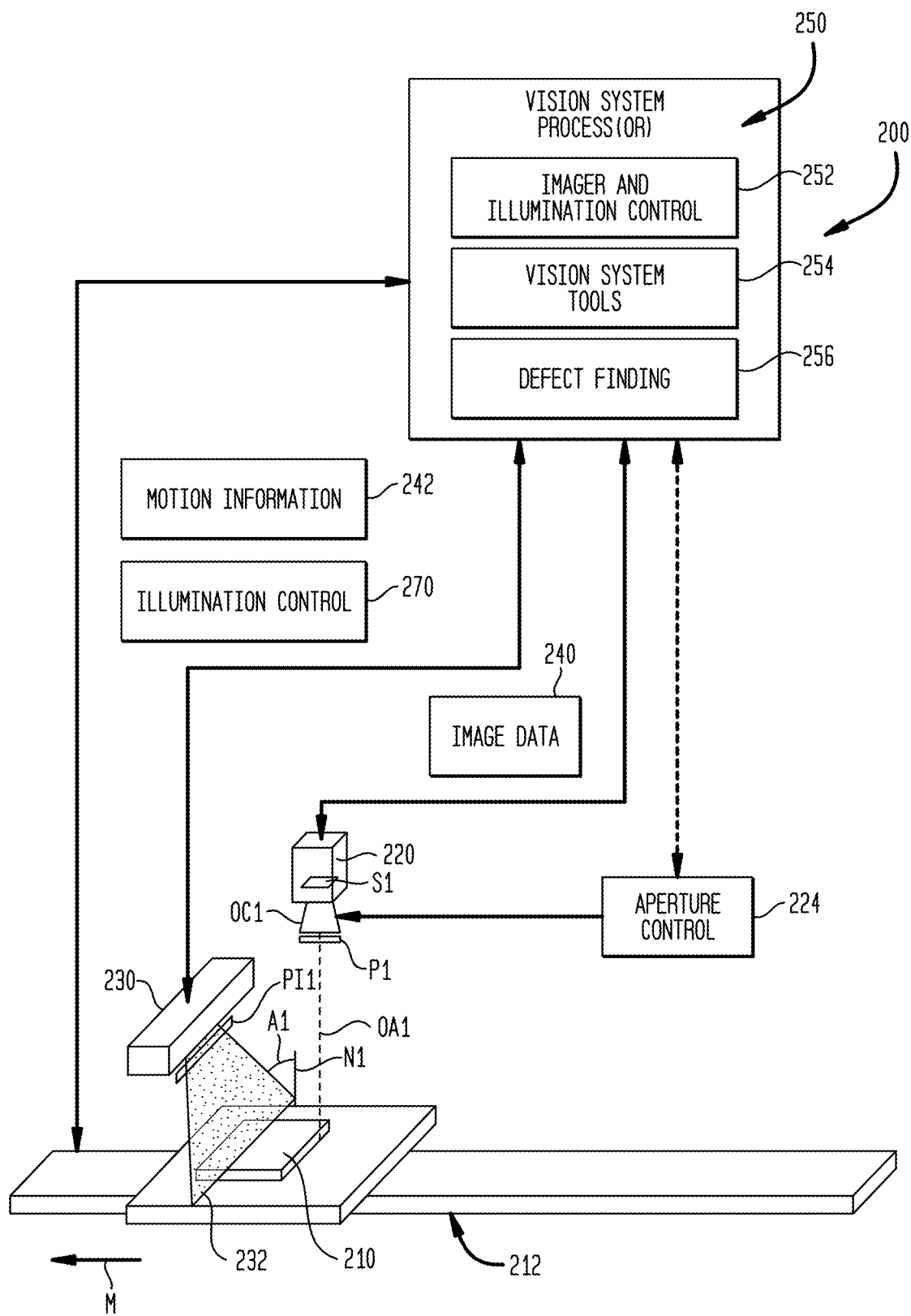
FIG. 2 is a diagram of an exemplary vision system with a camera having a line-scan (1D) pixel array, acquiring an image of an exemplary moving object surface with defects, including an illuminator and aperture control arranged to resolve surface deformity defect features on a specular surface thereof.

With reference to FIG. 2, a vision system arrangement 200 is shown, in which the exemplary object 200 with a specular surface is directed along a motion direction (arrow M) through the imaged scene. Illustratively, the object is moved by a motion conveyance 212 that can comprise a motion stage or conveyor. The camera 220 in this embodiment includes a sensor S1 and optics OC1. Illustratively, the sensor S1 in this embodiment is arranged as a 1D array of pixels (or is a 2D array in which one row of pixels is addressed), thereby defining a line scan camera. In an embodiment, the camera can operate to allow reading out one or more lines of a 2D pixel array. In such arrangements, time domain techniques that should be clear to those of skill are used to combine the pixel information from the lines into a single image. Thus, the object can be scanned mechanically while the imager is sequentially read-out forming a progressively scanned image of the part. The dimensions of the image can, thus, be much greater than the high contrast area of the imaging system or the detector. In alternate embodiments note that the imaging/illumination system can also be scanned as a unit while the part remains stationary. Thus, line-scanning can often provide a high contrast over an area of unlimited size as opposed to the stationary arrangement of FIG. 1 in which high-contrast is focused on a spot or region. However, both moving and stationary object arrangements have advantages in certain applications.

The optics OC1 included aperture control 224 as described above. The scene is illuminated by an illuminator 230 that illustratively projects a line 232 of light onto the scene and surface of the object 210. Notably, the line extends parallel to the direction of extension of the sensor pixel array and orthogonal to the direction of motion M. The optical axis OA1 of the camera sensor S1 and optics OC1 is generally perpendicular/normal to the generalized surface plane of the object and the projected "fan" of light is oriented at a non-perpendicular (acute) angle A1, with respect to the surface plane normal N1. The camera transmits image data 240 in the form of a sequence of scan lines to the vision system process(or) 250. The process(or) operates similarly to the above-described process(or) 150 (FIG. 1). In this embodiment, the conveyance also transmits motion information (e.g. in the form of encoder clicks or pulses) 242 to the process(or) 250. This information is used to register each scan line relative to a physical coordinate space of the object (e.g. based upon a predetermined physical motion increment in motion direction M associated with each pulse). This allows the process(or) 250 to construct a 2D image of the object from a series of 1D pixel lines. The process(or) 250 can be part of an appropriate processing device (not shown, but similar to device 160 above). The process(or) 250 also provides illumination control 270 and delivers appropriate defect information relative to the object surface based upon operation of the imager and illumination control 252, vision system tools 254 and defect finder 256. These operate similarly to those in the above-described process(or) 150 (FIG. 1). The camera optics can include a polarizer P1 and the illuminator 230 can, likewise, include a polarizer, the function of which are described further below.

In an embodiment, the illuminator can define an LED-driven, fiber optic illuminator or any other acceptable illuminator. In either arrangement, light can be provided in visible, IR or near IR, among other wavelengths. Note that in various embodiments, the relative motion between the object and the camera can be achieved by moving the object, moving the camera or moving both the object and the camera. Motion can be linear or arcuate.

II. Optical Relationships

Figure 3:
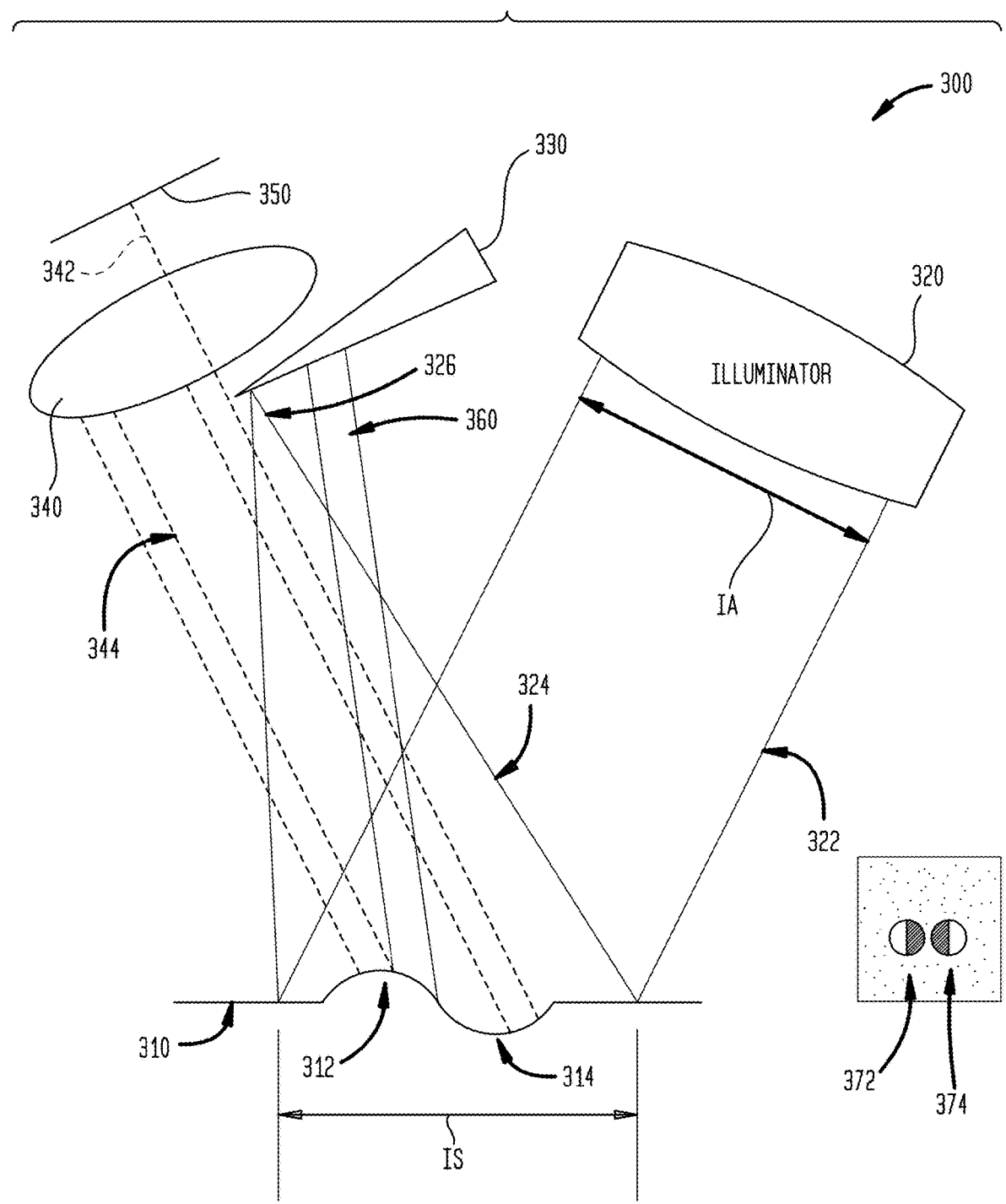
FIG. 3 is a diagram of the application of a knife-edge effect to resolve surface deformity features on the surface in accordance with the arrangement of FIG. 1 or FIG. 2.

Having described two exemplary arrangements 100 and 200 for acquiring images of an object with a specular surface containing surface deformities such as crater and hill defects, the operation of the system in association with various exemplary surfaces is now described in further detail. The following description relates to both arrangements. As shown in the exemplary (schematic) arrangement 300 FIG. 3, an exemplary surface 310 containing a hill 312 and a valley 314 is illuminated by a light source oriented at a non-perpendicular angle. The illuminator 320 defines an area (represented by width IA) that is generally greater than the area (represented by width IS) by the spot illuminated on the surface 310. This illuminated spot or surface is a region under inspection, which can contain the hills and valleys. The rays 322 of illumination by converge on the spot based upon a appropriate condensing optics (that can be conventional) in the illuminator 320, and the reflected rays 324 continue to converge to a spot 326 either near the entrance aperture of the camera or on the aperture stop inside the camera. At either location, the light reflected from the surface is primarily blocked by a knife-edge structure 330 and/or aperture stop (e.g. a variable lens iris). Based upon the relative tilt of the illumination beam and the camera optical axis 342 with respect to each other and the surface 310, the light reflecting from the sloped parts of the hill and valley defects (rays 344) is mostly reflected past the knife-edge structure 330, and into the entrance aperture of the optics 340 to reach the sensor 350. Light on opposite slopes of each defect is reflected fully away from the entrance aperture/optics 340 and/or into the knife-edge structure 330 (rays 360).

The resulting image 370 of the region on the surface 310 has the form of shadowgraph in which the imaged hill 372 is light (based on entering rays 344 from the facing slope) on one half and dark on the other half (based on blocked rays 360 from the opposing slope); while the imaged valley is dark on one half (based on blocked rays 360 and light on the opposing half (based on rays 344 from the facing slope). The system can discern a hill from a valley based upon which half is dark and which half is light—as depicted light left halves denote a hill, while light right halves denote a valley. The region surrounding hills and valleys can be dark or a less intense field than the slope-reflected regions. This effect results as the slopes facing the camera optical axis tend to focus the reflected light thereon and deviations in this slope (first derivatives) result in a high contrast variation in intensity for the defect, while light from the regions surrounding the defect is effectively attenuated (several orders of magnitude less in intensity) by the combination of tilt and the blocking effect of the knife-edge.

It should be clear to those of skill that setup of the arrangement 300 entails appropriate spacing and tilt of the illumination beam with respect to the tilt and spacing of the camera relative to the surface. The setting of the knife-edge—either by positioning of an external structure or movement of an adjustable iris is then used to derive the desired level of light blockage required to enhance the defects in the imaged field.

III. Further Applications

Figure 4:
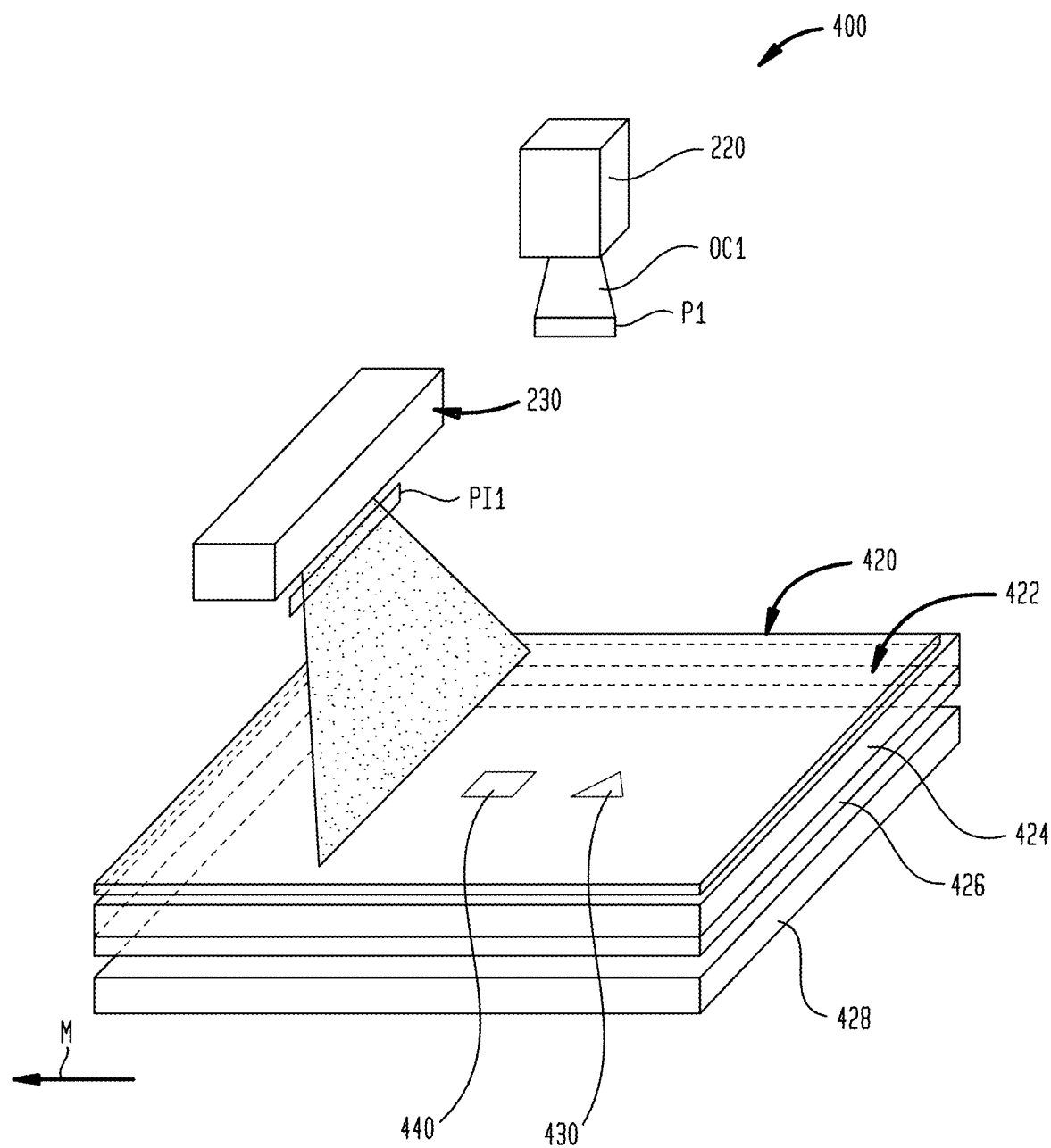
FIG. 4 is a diagram of the vision system arrangement of FIG. 2 scanning an exemplary object constructed to include a plurality of layers including an exemplary polarizing layer in the manner of an AMOLED display, in which the object includes hill and valley defect features within at least one of the layers.

The vision system arrangements above can operate on a variety of objects and surfaces. A line-scan version of the arrangement 400 is shown in FIG. 4 in which the line scan vision system camera 220 (described above in FIG. 2) images a moving (motion M) object 420, passing under a line-illuminator 230 as described above. In an exemplary embodiment, the illuminator 230 can include a linear polarizer PI1 and the camera optics OC1 can include a crossed polarizing filter P1. By way of example, the object can define a specular, layered surface, such as an AMOLED display. This example includes a top anti-reflective coating 422 on a glass or sapphire top layer 424. This covers a polarizer and/or other filters and coatings 426 that reside over the active display layer 428. The active layer 428 includes an exemplary hill defect 430, residing above the layer and a valley defect 440, below the layer.

Figure 5:
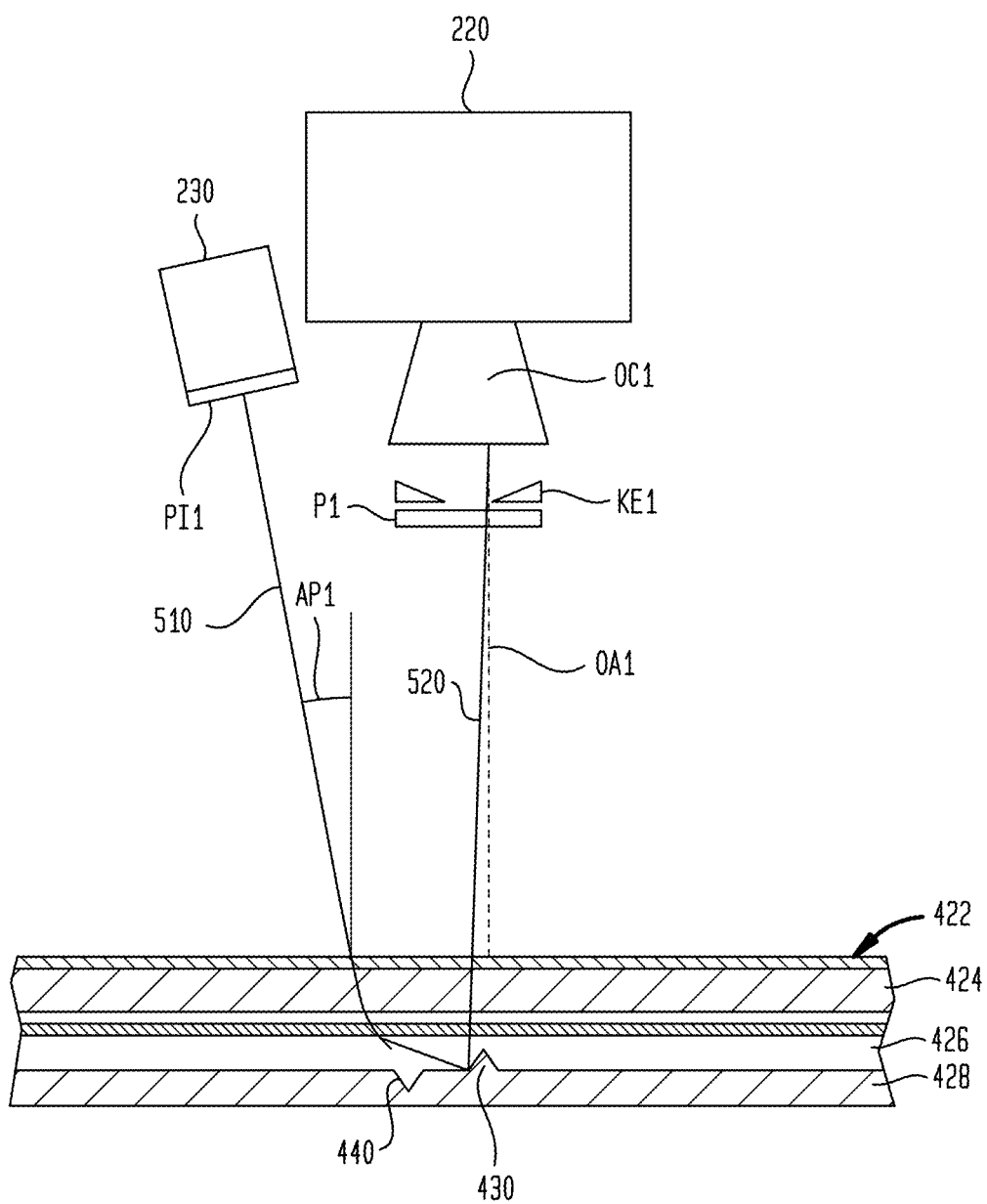
FIG. 5 is a side view of the vision system arrangement and exemplary scanned object of FIG. 4 showing the optical path of illumination and acquired, reflected light for a hill defect feature.
Figure 6:
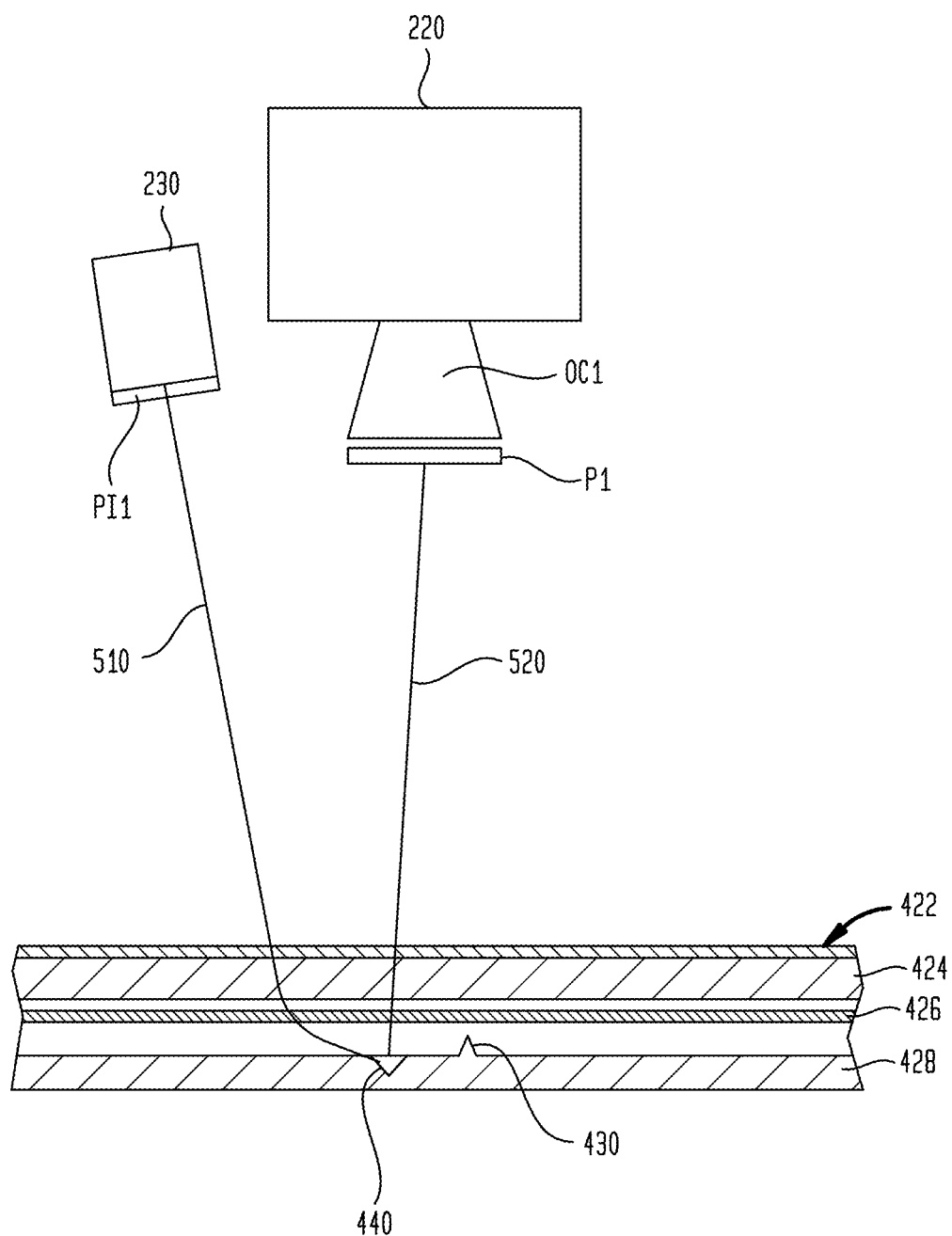
FIG. 6 is a side view of the vision system arrangement and exemplary scanned object of FIG. 4 showing the optical path of illumination and acquired, reflected light for a valley defect feature.

With reference also to FIGS. 5 and 6, which show the illuminator light beam 510 at a tilt AP1 with respect to the camera optical axis OA1, the exemplary (active) AMOLED layer 428 can define a conventional polarization rotating layer, such as a ¼λ retarder. Thus, by transmitting a polarized illumination beam 510, the arrangement 400 can take advantage of the inherent properties of the object. The top surface typically reflects some illumination light 510 through Fresnel reflection. This light is blocked mostly by the edge of the entrance aperture of the camera optics OC1. The remaining light that could enter this aperture is blocked by the crossed polarizer P1 at the entrance aperture, which is oriented 90 degrees to the illumination polarizer PI1. Illumination light that penetrates the top layer 422, 424 passes through a ¼λ retarder, and reflects off the active surface 428, thereafter, passes a second time through the ¼λ retarder transforming from linear polarization to circular polarization after the first pass, and then back to linear polarization, rotated 90 degrees on the second pass. This reflected light beam 520 the exits the surface to pass through the polarizer P1 into the entrance aperture of the camera optics OC1. In this manner, only light that reaches the layer containing a defect (hill 430 in FIG. 5 and valley 440 in FIG. 6) is received by the image sensor, and this received (filtered) light is then resolved by the knife-edge to discern sloped defect features.

Due to the presence of different film and coating layers on the surface of the object (e.g. anti-reflective coating layer 422), it can be desirable to provide an illumination beam 510 that is in the IR or near-IR range/band of wavelengths. Most coatings and films on specular surfaces (e.g. AMOLED displays, etc.) are used to filter light in the visible light spectrum. Thus, the use of an IR or near-IR illuminator overcomes the filtering effect of these coatings or film layers due to the longer wavelength of the transmitted illumination light. Note that a knife-edge structure KE1 of any acceptable arrangement is provided in conjunction with the camera optics OC1. In an embodiment, this can be located between the lens and polarizer P1. In embodiments, the knife edge can be integrated with the polarizer as described further below.

Figure 7:
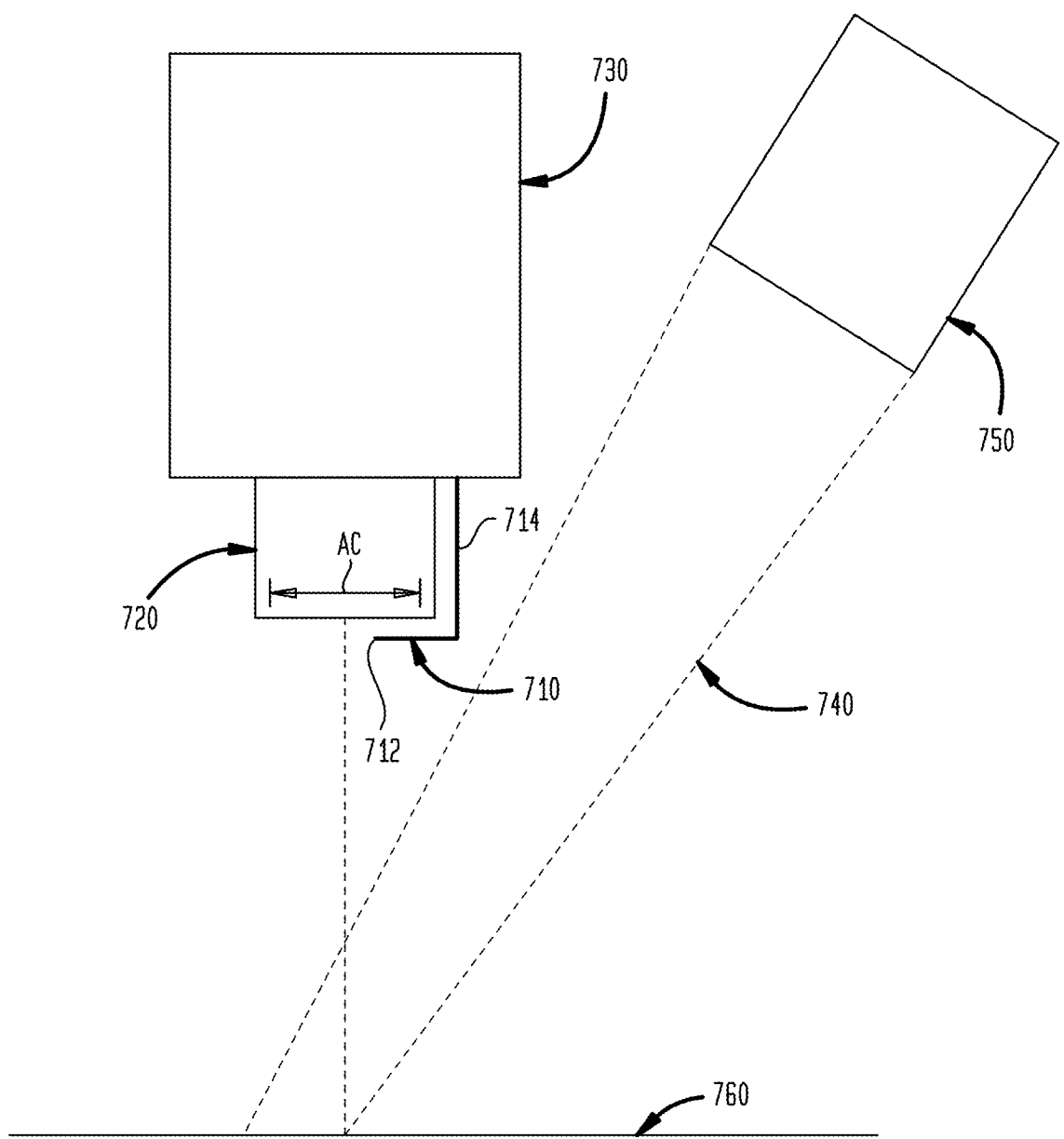
FIG. 7 is a side view of a vision system arrangement showing the use of an external knife-edge structure in association with the camera and optics according to an illustrative embodiment.

With reference to FIG. 7, it is contemplated that a knife-edge structure can be applied to the optical path of the camera and optics in a variety of ways. A basic knife-edge structure 710 with blade 712 and bracket 714 is shown mounted in front of the lens optics 720 of a vision system camera 730. The knife-edge structure occludes part of the overall aperture AC, thereby interacting with the sloped illumination beam 740 of illuminator 750 as it reflects off the surface 760.

FIG. 8 shows another embodiment of an arrangement 800, in which a pair of illumination assemblies 810 and 812 project respective beams 820 and 822 of light on a specular, defect-containing surface 830. Each beam 820, 822 is tilted in a different orientation (respective angles 840 and 842) relative to the optical axis of the optics 852 and sensor 854 of a vision system camera 850. Thus, the light is reflected by different (potentially opposite slopes of hills and valleys). A pair of corresponding knife-edge structures 860 and 862 is positioned in front of the optics entrance to occlude the reflected beams 820 and 822, respectively. Alternatively, the knife-edge can be provided to both beams by the adjustable (double arrow 870) iris 872 of the optics (lens) assembly 852. Note that additional (more than two) illuminators can be used to illuminate the surface with respect to other tilt angles, and appropriate knife-edge structures can be employed.

In general, adjustment of a lens aperture can be accomplished in a variety of manners. Where an adjustment ring is provided on the lens body, a user can rotate such while observing a display of an exemplary object until the appropriate high-contrast image of defects is achieved. This process can be performed automatically where the lens and/or camera assembly includes an electromechanically (or otherwise) driven iris. The vision system processor can be used to optimize aperture setting by determining what setting allows the defects provide the highest contrast difference in the acquired image.

Reference is now made to FIGS. 9 and, 10, which show diagrams of an exemplary vision system 900 and 1000 (respectively) with a vision system camera 910 and 912 optics with a 2D pixel array, acquiring a 2D image of exemplary stationary object 920 with specular surface, including one illuminator 930 (FIG. 9) or a plurality of (e.g. two) illuminators 1030 and 1032 (FIG. 10), each of which provide off-axis illumination to illuminate the above-described hill and valley defect features on, or under, the specular surface of the object 920. The aperture iris or another structure associated with the optics 912 provides the above-described knife-edge (which is represented generally by element KE2). The illuminator(s) 930, 1030 and 1032 can each be an LED illuminator (as shown by exemplary off-axis LED 940 and optics 942), fiber bundle illuminator, or any other acceptable front light illuminator. A beam splitter 950, 1050 and 1052 of conventional design is located in line with each optical axis 960, 1060 and the illuminator projects a beam at a 90-degree angle relative to the axis 960, 1060 can define plate, cube, prism, or any other device which can split an incident light beam into two or more beams, which may or may not have the same optical power, and may or may not be oriented at a 90-degree angle. In this manner, the off-axis illumination becomes coincident with the optical axis of the imager. This allows for a more compact design and potentially allows the illuminator to be integrated with the camera optics. While one illuminator 930 is employed in FIG. 9, the use of two illuminators 1030, 1032 (FIG. 10), providing illumination from (e.g.) opposing sides, generates a more uniform image of the defects on the surface. Note that the beam splitter can include various polarizing filters and other light-conditioning components, including lenses, etc. For example, the camera can include polarizer P2 in conjunction with the optics 912. The illuminators 930, 1030 can include a corresponding polarizer PI2 in the light path and illuminator 1032 includes a corresponding polarizer PI3 in its light path. The polarizers are arranged and function as described above (see FIG. 5)

IV. Results

Figure 11:
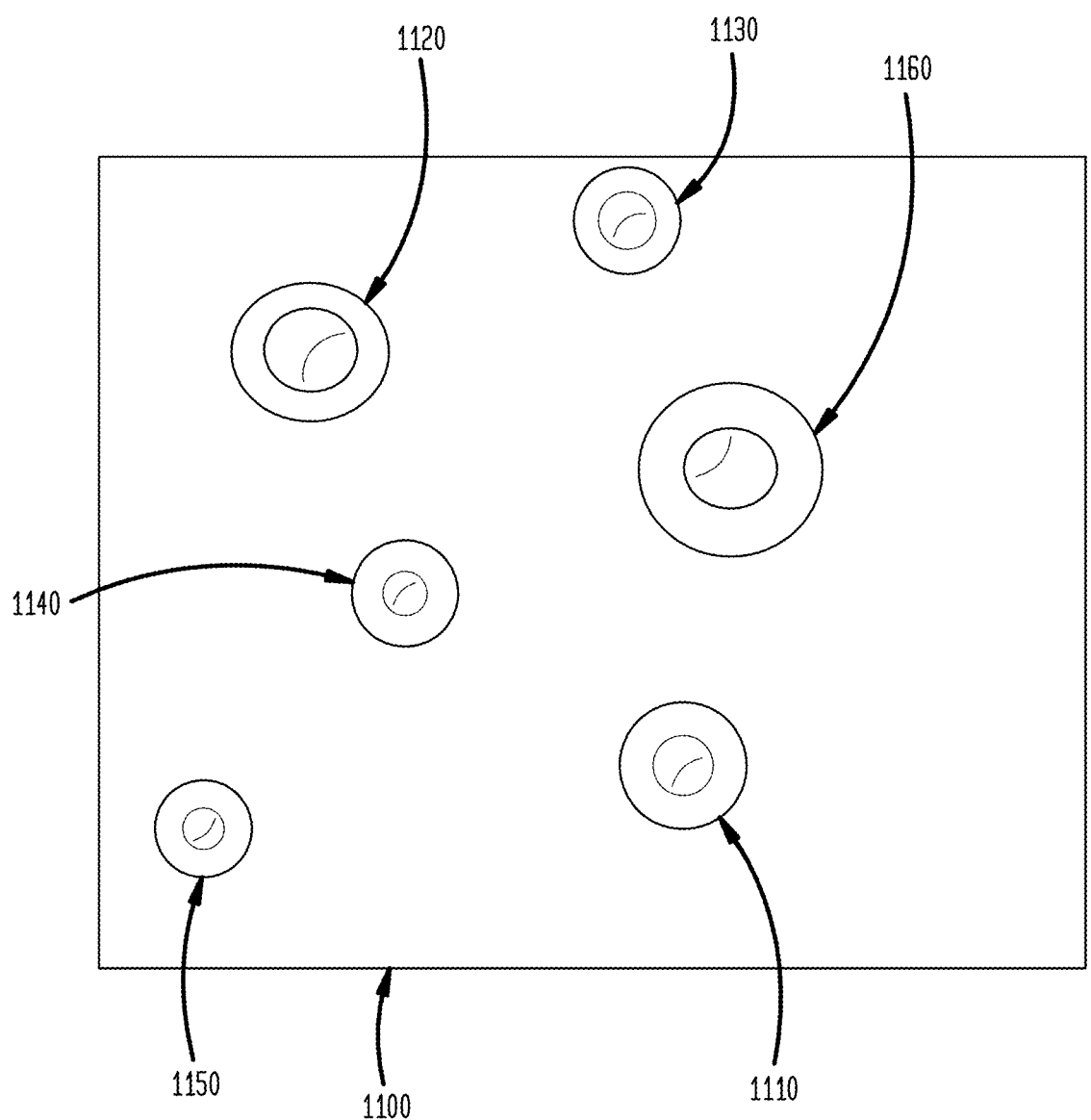
FIG. 11 is a representation of an image of an exemplary object surface with visible defect features each displayed in the form of a shadowgraph on the surrounding surface using the vision system according to the embodiments herein.

FIG. 11 shows a graphical representation of a display image 1100 produced by the vision system in accordance with an embodiment herein. The image details an object surface in which a plurality of surface (or sub-surface) defects 1110 1120, 1130, 1140, 1150 and 1160 have been identified. These exemplary defects are each valleys (1110, 1120, 1130 and 1140) or hills (1150 and 1160) as their light and dark halves are oriented in a differing direction, depending upon whether a hill or valley is illuminated. However each hill and each valley show light and dark halves with a common orientation, regardless of size/shape, as a result of the tilt of the illumination. Further vision system processes can employ the image data related to the defects to determine whether they represent a size that is potentially unacceptable.

V. Detection and Evaluation of Wavy Surface Features

The above-described system and method can be employed to determine imperfections/defects in the form of undulating, rippled or wavy surface features on a specular object. By way of example, a flat panel screen can define a region of (somewhat continuous) rippled (wavy) features rather than a hill or dimple. While some waviness can be acceptable, it is contemplated that an excess of such features, in terms of area or magnitude (amplitude) of the ripples can exceed an acceptance threshold, causing the object to be deemed defective.

Figure 12:
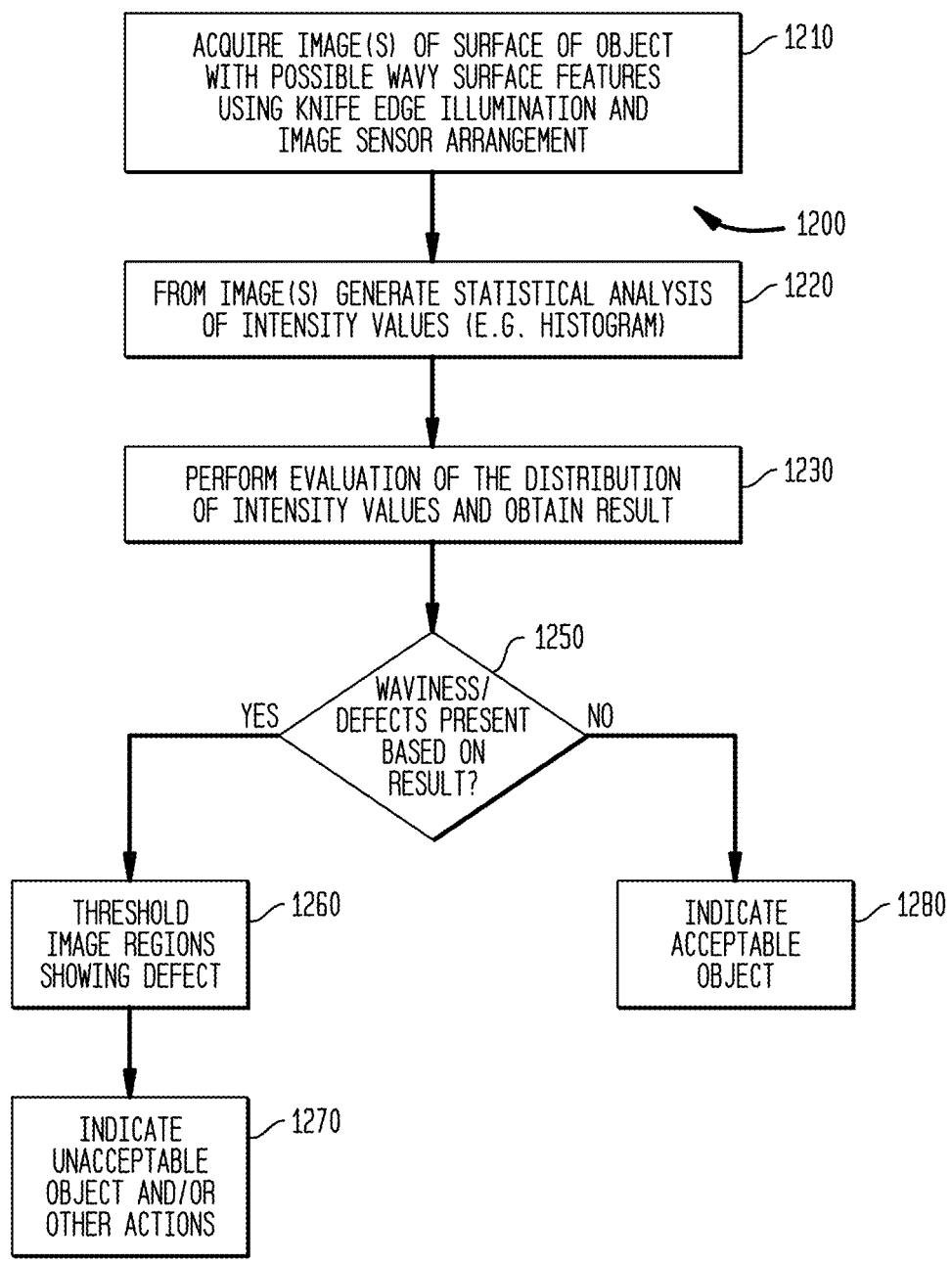
FIG. 12 is a flow diagram of a procedure for determining waviness on a specular surface of an object using off-axis illumination and a knife-edge arrangement according to an embodiment.

FIG. 12 details a procedure 1200 in which the waviness of a specular surface is determined and evaluated. In step 1210 of the procedure 1200, the image system acquires images of the possibly wavy, specular object surface using off-axis illumination and a knife-edge structure as described generally above. This image can be acquired of the entire object concurrently using an appropriate lens, or can be acquired in a line-scan manner (described further below). The illumination and knife-edge arrangement causes most of the light projected onto the surface to be reflected away from the image sensor optics, or into the knife-edge structure, and a fraction of the reflected light, based upon the slope of the wave or ripple, is directed into the image sensor. This results in a light ripple (e.g. a line) surrounded by a darker field. A series of such ripples, appearing as bright lines, is defined in the acquired image.

In an exemplary embodiment, the acquired image data can be subjected to various image processing procedures— such as a Gaussian smoothing process.

Figure 14:
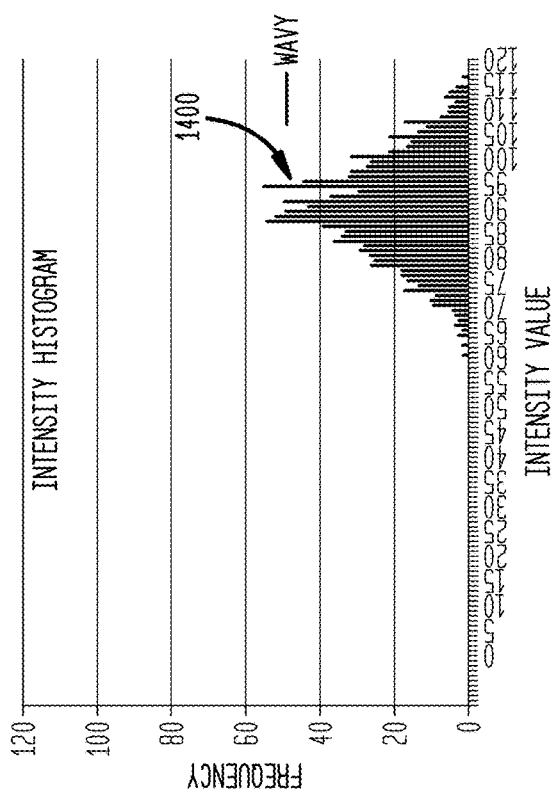
FIGS. 13-15 are exemplary histograms of image intensity showing the response from a combination of smooth and wavy surface features, wavy surface features and smooth surface features, respectively.
Figure 15:
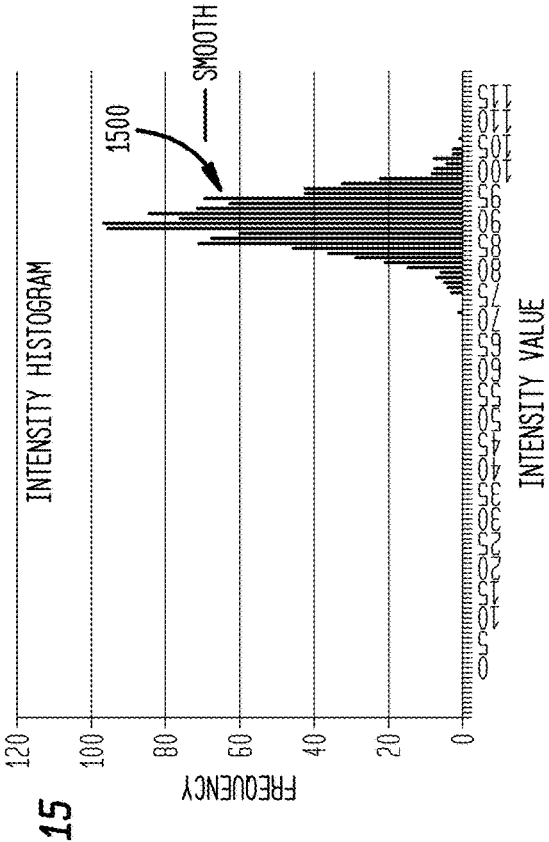
Figure 13:
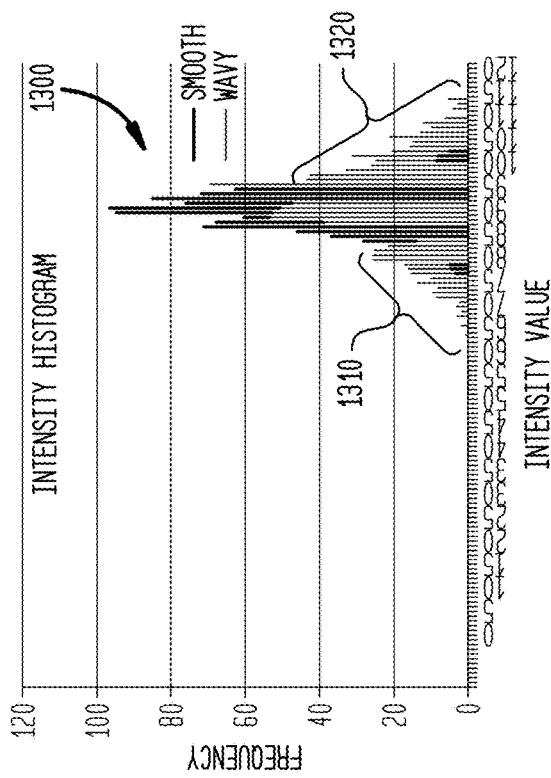

In step 1220 of the procedure 1200, the overall image intensity map of the pixels in the acquired image can be subjected to statistical analysis—for example a histogram of pixel (grayscale) intensity versus pixel frequency in the image. With reference to FIG. 13, a histogram showing an image with both smooth and wavy surface features is shown. In general, smooth regions exhibit a closely packed intensity distribution of high frequency. Conversely, wavy regions exhibit a wider spread (histogram areas 1310 and 1320) of intensity, at lower frequency. Hence, a wavy region can be represented by the relatively wide histogram 1400 of FIG. 14, while a smooth region can be represented by the relatively narrow histogram 1500. Note that this is one of a variety of statistical techniques—generally involving the degree of occurrence of certain pixel intensity values—to analyze smooth versus wavy regions of an acquired image.

Referring again to the procedure 1200 of FIG. 12, the distribution of intensity values in e.g. the histogram(s) is evaluated (step 1230). The evaluation can include a histogram analysis in which (for example) the grayscale level distribution of pixel vales is computed and histogram tails are generated. The procedure 1200 then determines if waviness or other defects is/are present by (for example) computing if the histogram tails are within an acceptable range of mean values (decision step 1250). If waviness/defects is/are present (e.g. the histogram tails are outside the mean value range), then the procedure 1200 branches to step 1260. By way of example, the image for each histogram with a tail that is out of range can be subjected to a threshold. This threshold can be set by user or automatically determined. The size and location of all defects in the thresholded image(s) is then measured. If the measurement of any (or an aggregation of) defects yields a result in excess of a predetermined metric (which can be user-defined or automatically set) then the procedure 1200 indicate specific defects on the object surface and/or locations of such defects. The procedure can also take other actions, such as part rejection or signaling of an alarm (step 1270). Conversely, if waviness and/or defects are not indicated by the histogram tails then the object is deemed acceptable and generally free of substantial defects. This is indicated and/or no action is taken (step 1280).

Figure 16:
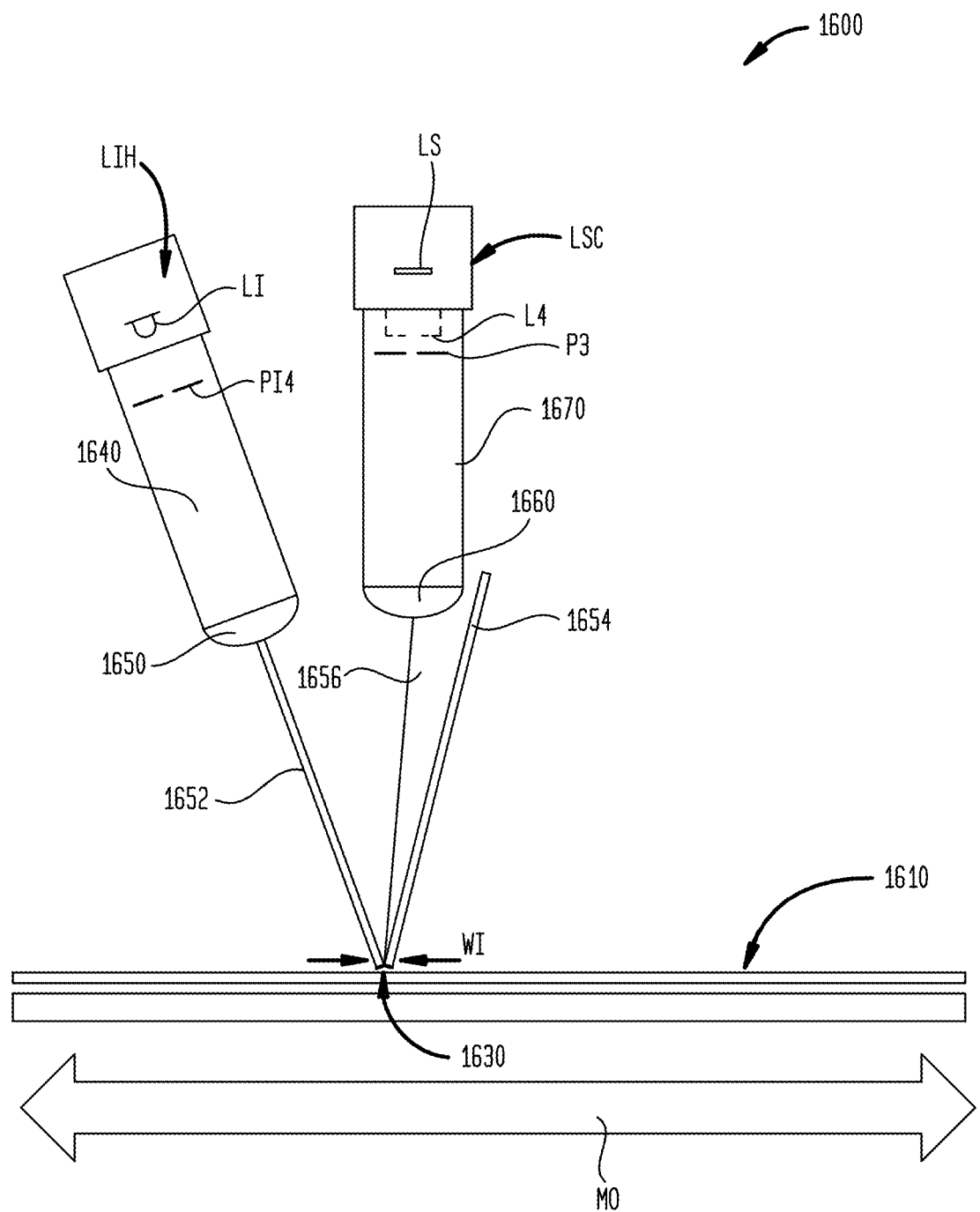
FIG. 16 is an exemplary optical arrangement of an illuminator and image sensor for illuminating and scanning lines of a surface according to an embodiment.
Figure 17:
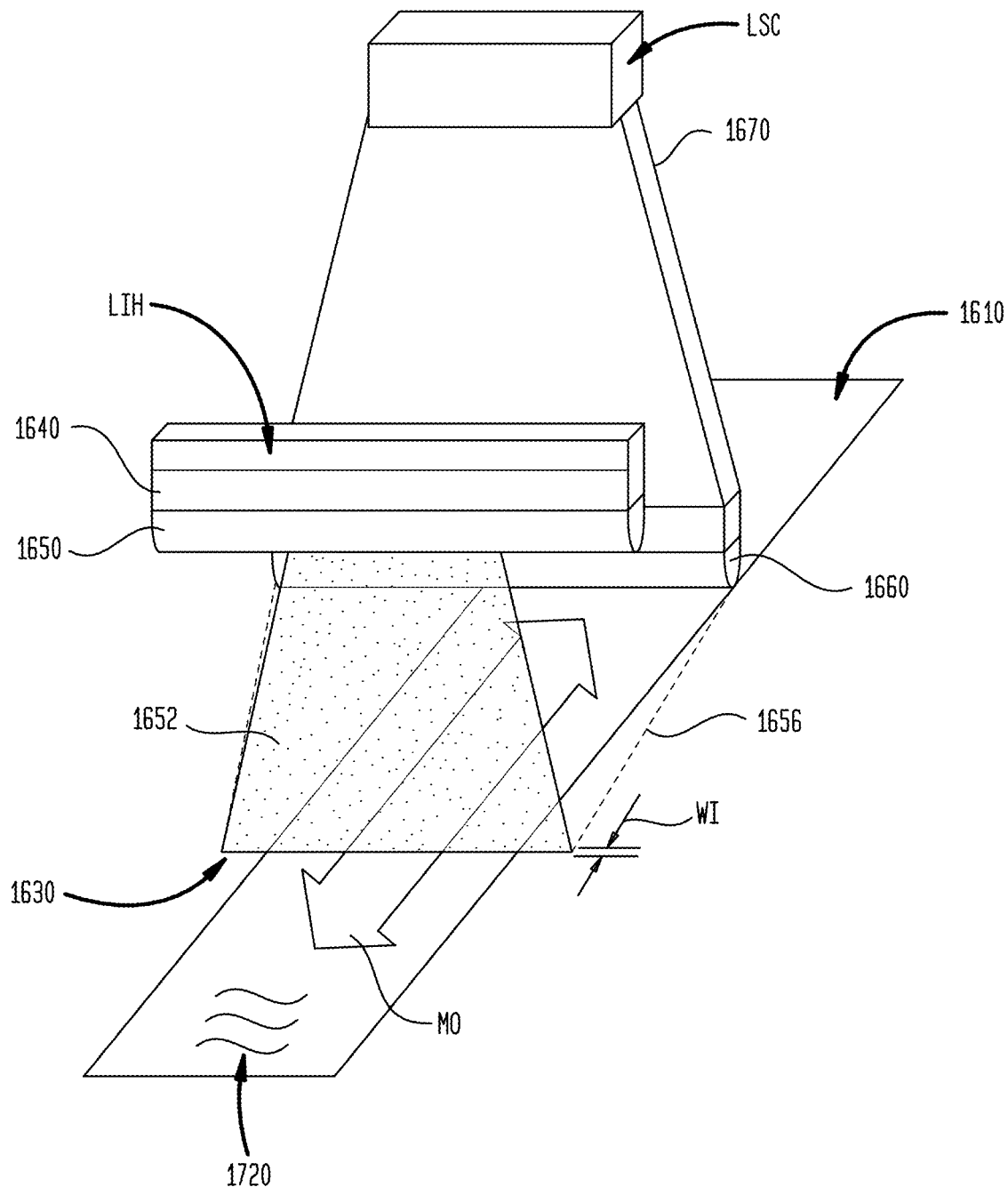
FIG. 17 is a perspective diagram of the diagram of FIG. 16.

The above-described procedure (1200) for evaluating wavy surface features on a specular object can be performed in the manner of a line-scan process. FIGS. 16 and 17 show an arrangement 1600 and 1700, respectively, in which an object 1610 with exemplary wavy surface features 1720 (FIG. 17) is directed along a known (e.g. via an encoder) motion (double arrow M) through the field of view (line 1630) of an image sensor LS. Note that the scan motion MO can be in either of opposing directions or in both opposing directions as appropriate. The image sensor LS resides in a camera LSC, and is configured as a line-scan sensor, with one row of pixels enabled to acquire the image reflected from the object surface. The region of the camera field of view 1630 is illuminated by off-axis illumination provided by a line illumination source LI within a housing LIH. This illumination source (LI) can be any acceptable light arrangement—e.g. a line of LEDs. The light is focused by a cylindrical lens 1650 of conventional deign and shape, which provides an illumination region of desired width WI and indefinite length (across the object surface transverse to motion direction MO). Note that in an exemplary embodiment, the illumination line width WI can be a few millimeters or less—but can be narrower or wider depending upon the resolution of the scan. Length is determined by the corresponding length of the light source LI and cylindrical lens 1650. The cylindrical lens is positioned at a spacing from the illumination source LI by an enclosed lens holder 1640 that provides a desired focal distance between the source LI and the surface 1610 of the object. In an exemplary embodiment, the cylindrical lens 1650 can be defined as a half-cylinder that is spaced by the lens holder 1640 at a distance that focuses the line in the surface. The off-axis projection of light as shown causes the majority of emitted light 1652 (projected as the depicted plane or fan in FIG. 17) to be reflected (line 1654) outside of the image sensor optics (e.g. lens aperture) LA, and/or any external knife-edge structure. The received light 1656, reflected by sloped surfaces is received by the line scan camera LSC as shown. In an exemplary embodiment another cylindrical lens 1660, located at the end of an enclosed lens holder 1670 focuses the received light into the camera optics (knife-edge structure LA) and line scan sensor LS. A variety of camera optics arrangements other than the depicted cylindrical lens should be clear to those of skill. As shown in FIG. 16, a polarizer PI4 can be provided within the light path of the illumination source LI (at varying locations therealong). Likewise, a polarizer P3 can be provided within the received light path of the sensor LS. These elements are also provided, but not shown, in the depiction of the arrangement 1700 FIG. 17 for clarity.

Note, while a cylindrical lens shape is employed, a variety of cross sectional shapes—e.g. a paraboloid—can be employed in alternate arrangements. Likewise, a mirror can be used instead of, or in addition to, a lens to focus the illumination light. Advantageously, the illumination arrangement ensures that the entire surface achieves a consistently high degree of illumination and each scanned line fully represents the local slope of the surface. This arrangement also advantageously allows any size surface to be imaged and analyzed for dimples, hills and waviness. For example a tablet or laptop screen, or a larger flat panel television can be analyzed by providing a sufficiently long line-illumination assembly and one or more line scan cameras across the object surface. Each camera can image a portion of the overall object and provide a separate, or stitched-together, evaluation of the surface.

Note also, it is expressly contemplated that a larger area of the object can be imaged in alternate embodiments using e.g. an illuminator in combination with a Fresnel lens or another optical arrangement.

VI. Line, Disk and Annular Optics Mask

Figure 18:
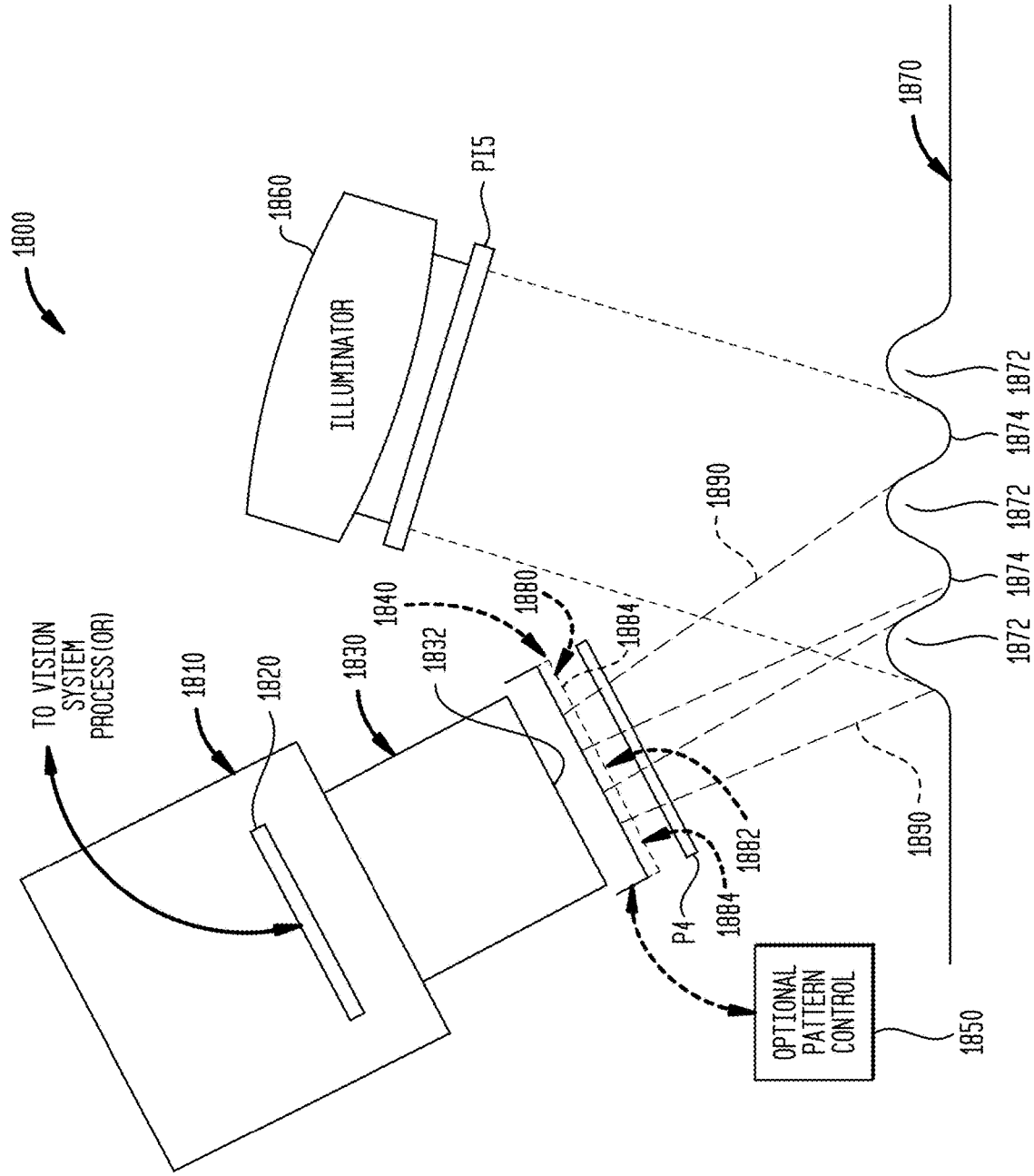
FIG. 18 is a diagram of an exemplary vision system camera and illuminator according to an illustrative embodiment in which a knife-edge element in the form of a mask is employed comprising a fixed or variable filter element located in front of or within the optics assembly of the camera.

FIG. 18 shows a diagram of an illustrative embodiment of a generalized vision system arrangement 1800 that includes a vision system camera assembly 1810 with an image sensor 1820 and optics assembly 1830. The sensor 1820 is interconnected (as shown) to a vision system process(or) in a manner described generally above, and carries out appropriate vision system tasks on images acquired by the sensor 1820. The optics assembly 1830 can be any acceptable variable or fixed focus and/or variable or fixed aperture lens unit, or combination of lens units—for example, a conventional M12 base, F-mount or C-mount lens.

According to an illustrative embodiment, the front 1832 of the optics/lens assembly 1830 can be covered with a fixed or movable mask assembly 1840. The mask assembly 1840 can be of a screw-on type or snap on, or can be mounted via a bracket (not shown) in front of the lens assembly 1830. The mask assembly 1840 can also be applied as an adhesive applique or coating directly to a front (or other) surface of the lens assembly. In the case of a screw-on attachment, the mask assembly 1840 can operate similarly to other conventional filters for use with various lens arrangements and can be adapted to thread onto the end of a conventional lens filter mount.

Optionally, the mask assembly 1840 can be manually or automatically (e.g. via solenoids, servos, steppers, etc.) into or out of the optical path of the lens as desired. The mask assembly can also define (e.g.) an electro-optical mechanism, which can vary between a fully transparent and partially opaque pattern of desired size and shape via an optional control circuit 1850. By way of non-limiting example, the mask assembly 1840 can include a window (typically circular) that includes a LCD shutter, or another form of configurable window.

The arrangement 1800 includes an illuminator 1860 as described above, oriented to project light at a non-perpendicular angle (as shown) with respect to the overall plane of the surface 1870. In this example, the surface 1870 defines waviness along at least one direction, consisting of a series of hills 1872 and intervening detents 1874. The angled light strikes, and is scattered by, the hills and detents with a portion of that light entering the camera optics assembly 1830. The mask assembly 1840 in its various forms, defines a knife-edge element that attenuates much of the scattered light and directs only light of a given, limited range of angles to the sensor 1820. The mask covering/coating in this embodiment is represented by a dashed line 1880 that includes a central covered region 1882 and outer covered regions 1884 with an open aperture between the central covered region 1882 and outer covered regions 1884, through which reflected light rays 1890 pass from the surface 1870. In various embodiments, a polarizer PI5 is provided in conjunction with the illuminator 1860 and a corresponding polarizer P4 can be provided in conjunction with the optics/lens assembly. The polarizers can be arranged and function as described generally above (see for example FIG. 5).

Figure 19:
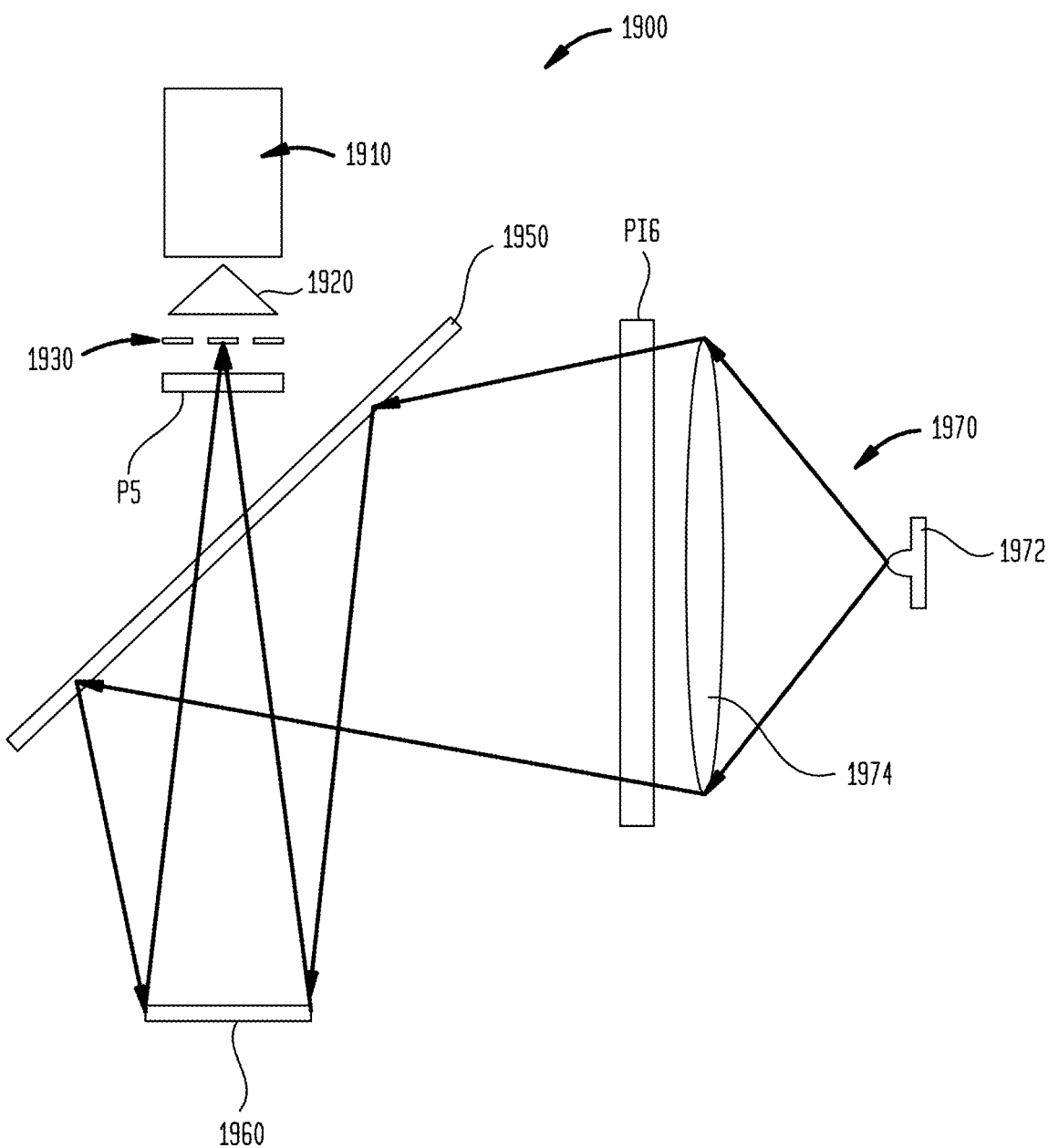
FIG. 19 shows a more-detailed example ofthe vision system arrangement according to an embodiment of the present invention.
Figure 20:
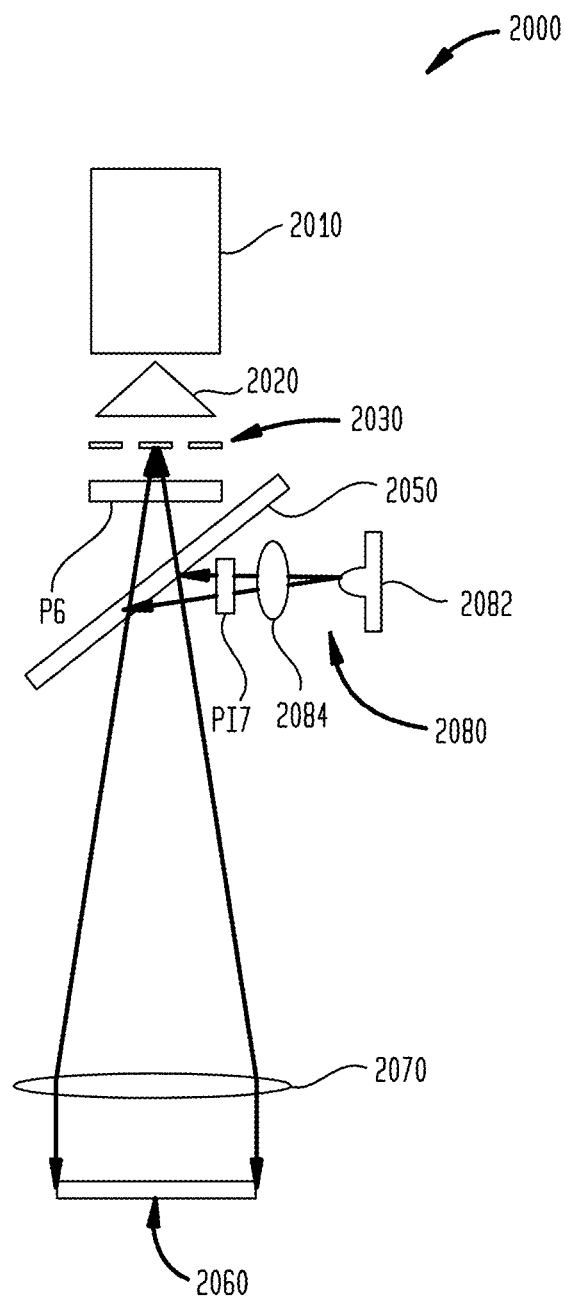
FIG. 20 shows a more-detailed example ofthe vision system arrangement according to another embodiment of the present invention.

FIG. 19 shows a more-detailed example of the vision system arrangement 1900 according to an illustrative embodiment. This embodiment includes a beam splitter and polarizer arrangement similar to that shown and described in FIG. 9 above. In particular, the arrangement 1900 includes a camera assembly 1910 and lens/optics 1920. The lens/optics 1920 includes a mask assembly 1930 according to the embodiments herein. In front of the mask assembly 1940 is a polarizer P5 that operates in accordance with the principles described above. A beam splitter 1950 is provided, through which reflected light from an object under inspection 1960 is transmitted to the camera 1910. An illumination assembly 1970 is provided. The illumination assembly 1970 includes an illumination source 1972 and a condenser lens 1974. A polarizer PI6 is located in front of the condenser lens. Note that the polarizer P5 can include the mask pattern on a face thereof, and the assembly can be provided as a screw-on or snap-on attachment to the front of the lens 1920.

Another vision system arrangement 2000 according to an illustrative embodiment. The arrangement 2000 includes a camera assembly 2010 and lens/optics 2020. The lens/optics 2020 includes a mask assembly 2030 according to the embodiments herein. In front of the mask assembly 2040 is a polarizer P6 that operates in accordance with the principles described above. A beam splitter 2050 is provided, through which reflected light from an object under inspection 2060 is transmitted to the camera 2010. In this embodiment, a condensing lens 2070 is placed between the beam splitter 2050 and the object 2060. The condenser operates in conjunction with the illumination assembly 2080, which includes an illumination source 2082, focusing lens 2084 and polarizer PI7. Note that the focusing lens 2084, condensing lens 2070, and other optical components can be sized and arranged in accordance with known optics principles clear to those of skill.

The central covered region and outer cover regions of the various mask assemblies described above can define a variety of geometric shapes, sizes and relationships. Selection of an appropriate mask can be made empirically or by trial and error to achieve the best image for a given surface under inspection. This is shown in further detail in FIGS. 21-27, which provide various types/sizes of mask patterns.

Figure 21:
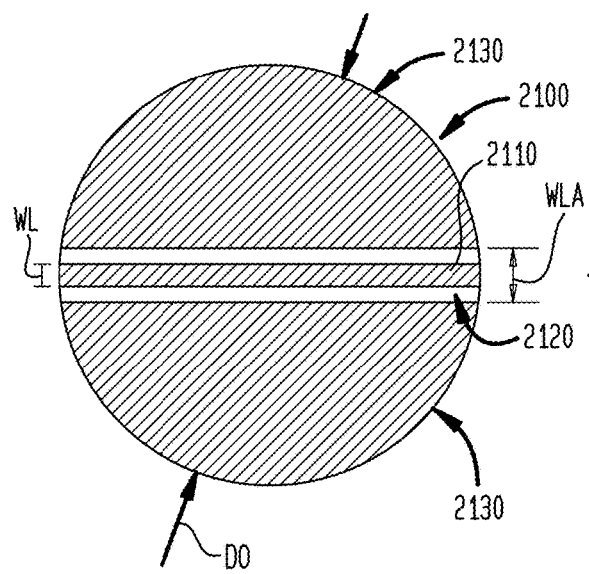
FIG. 21 is a front view of a mask for use with the exemplary camera of FIG. 18 defining an exemplary, opaque center line within a linear aperture.

With reference to FIG. 21, one form of mask 2100 that generates a knife-edge element defines a central, opaque line 2110, centered within a transparent linear aperture 2120. The remaining, outer area 2130 of the mask, surrounding the transparent aperture 2120 is also opaque. The line(s) 2110, 2120 are oriented generally parallel to the elongation direction (if any) of the characteristic waviness of the surface, and this form of mask is most effective in such conditions. More generally, the direction of elongation is chosen (for example, by rotating the mask) to enhance or suppress surface features as desired. By way of non-limiting example, and to better understand the function of the arrangement, the width of the aperture WLA is variable—for example between 5 and 10 millimeters and the center opaque line WL is between 1 and 5 millimeters for a lens with a diameter D0 of 50-55 millimeters. In general, the width WL of the line is sized to match the width of a focused spot from the illumination. Note that each of the following mask arrangements (FIGS. 22-27) assumes a similar lens diameter D0. The overall dimensions can vary proportionally for lenses of larger or smaller diameter.

Figure 22:
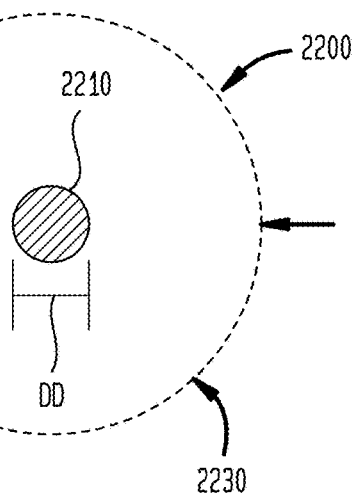
FIG. 22 is a front view of a mask defining an exemplary, circular disk element at a center of the optics assembly.

FIG. 22 shows a mask 2200 consisting of a central opaque, circular (occulting) disk 2210 of diameter DD (between 5 and 10 millimeters). This disk provides the desired knife edge element to the arrangement. In general, the size of the disk is chosen to match the size of the surface feature (e.g. defect) to be enhanced or suppressed. Note that this exemplary mask arrangement 2200 is free of any outer opaque regions to the edge (dashed circle 2230) of the lens, and is transparent. This basic knife edge element allows for receipt of light within a given angular range from hills and detents that can be oriented in various directions on the surface.

Figure 23:
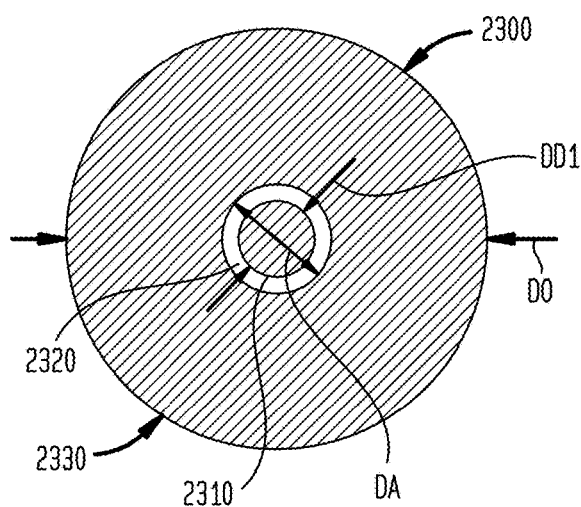
FIGS. 23-27 are each respective front views of an exemplary, opaque disk element and outer annular element separated by an annular aperture therebetween, and each element defining a predetermined diameter.
Figure 24:
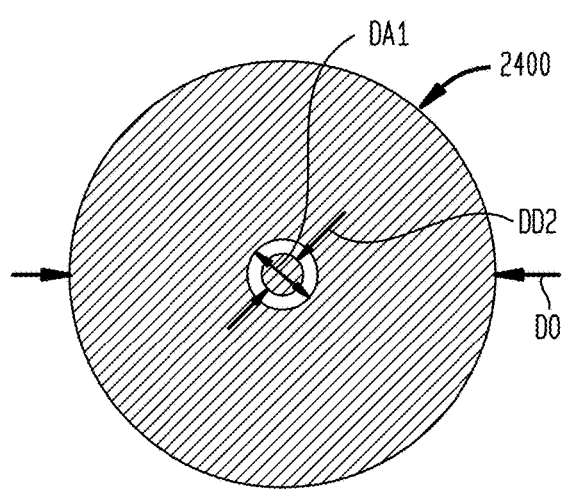
Figure 25:
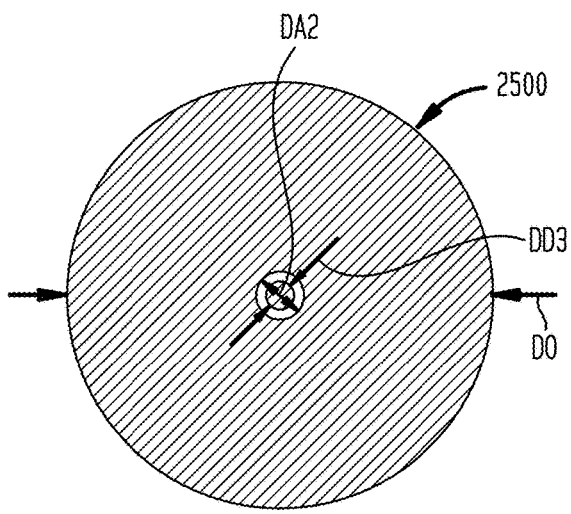
Figure 26:
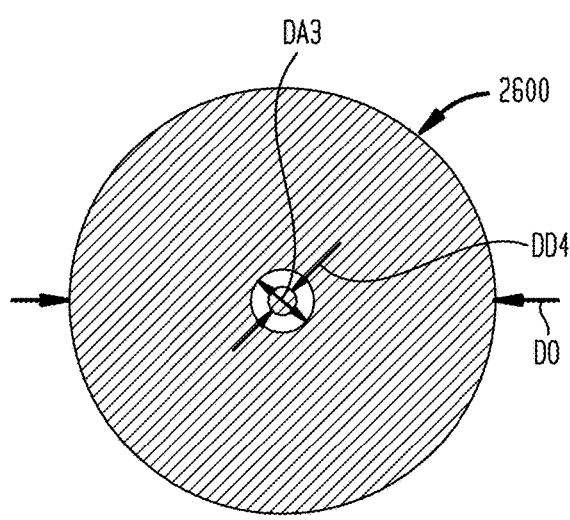
Figure 27:
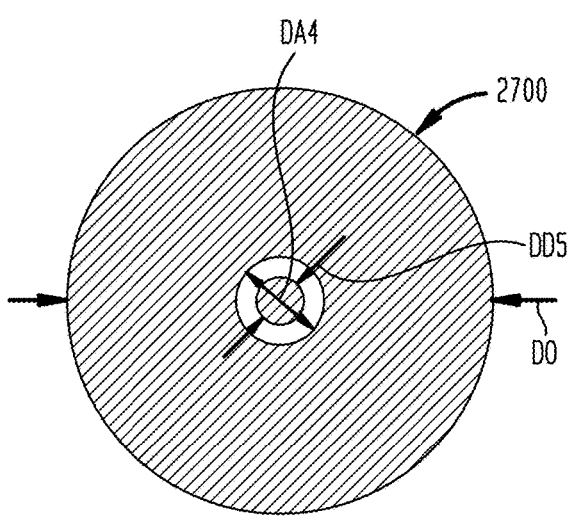

FIG. 23 shows a mask 2300 that defines a central, opaque (occulting) disk 2310 having a diameter DD1 (of approximately 9 millimeters) and an annular opaque outer region 2330 having an inner diameter DA (of approximately 14 millimeters). The difference between the disk diameter DD1 and outer region 2330 generates a transparent annular window 2320 through which light reflected from the surface can pass. Notably, the diameter of the central occulting disk defines the degree of attenuation of light in the manner of a knife edge element, while the diameter of the annular outer region defines a confocal effect in the optics system for increased clarity.

Some further examples of the mask configuration 2400, 2500, 2600 and 2700 with central occulting disk and outer annular region, defining an annular aperture therebetween are described in respective FIGS. 24, 25, 26 and 27. By way of non-limiting example, the disk diameter DD2 of the mask 2400 is approximately 5-6 millimeters and the outer annular region inner diameter DA1 is approximately 8-9 millimeters. The disk diameter DD3 of the mask 2500 is approximately 3-4 millimeters and the outer annular region inner diameter DA2 is approximately 5-6 millimeters. The disk diameter DD4 of the mask 2600 is approximately 3-4 millimeters and the outer annular region inner diameter DA3 is approximately 8-9 millimeters. Additionally, the disk diameter DD5 of the mask 2700 is approximately 5-6 millimeters and the outer annular region inner diameter DA4 is approximately 10-12 millimeters. These dimensions are merely exemplary of a wide range of possible dimensions that can be tuned to the individual characteristics of the surface under inspection angle, illumination intensity and/or wavelength(s) in the vision system arrangement.

As described generally above, the mask can be constructed by applying a coating with the appropriate pattern to a filter-like glass surface using a variety of techniques (e.g. screen-printing, photolithography, application of a transparent film with printed or molded pattern, etc.). It should be clear to those of skill that a variety of techniques can be employed to apply a fixed mask pattern to the camera optics. Likewise, as also described above, the mask can define an active component that includes, for example, a pixelated surface. A controller that is either separate from, or part of the vision system processor, selectively addresses individual pixels of the active mask to generate a desired shape and size of mask pattern. Notably, the controller can be adapted to step through various configurations until a user or automated vision system process (for example based on contrast) determines the best pattern setting. Patterns can be similar in shape to those described in FIGS. 21-27, or can have more complex shapes that better conform to unique surface characteristics and/or waviness patterns.

Note that in certain embodiments a plurality of cameras, interconnected to one or more vision system processors can be employed. Each camera can acquire an image of the object surface with a differing size and/or configuration of mask (e.g. different size occulting disks, from a similar or different angle and a plurality of images of the surface can be analyzed to ensure waviness features of differing sizes, shapes and/or orientation are appropriately imaged. Similarly, where the mask is variable (either by placing different masks in front of the optics, or by varying the pattern of the mask, a plurality of images can be acquired and analyzed.

Figure 28:
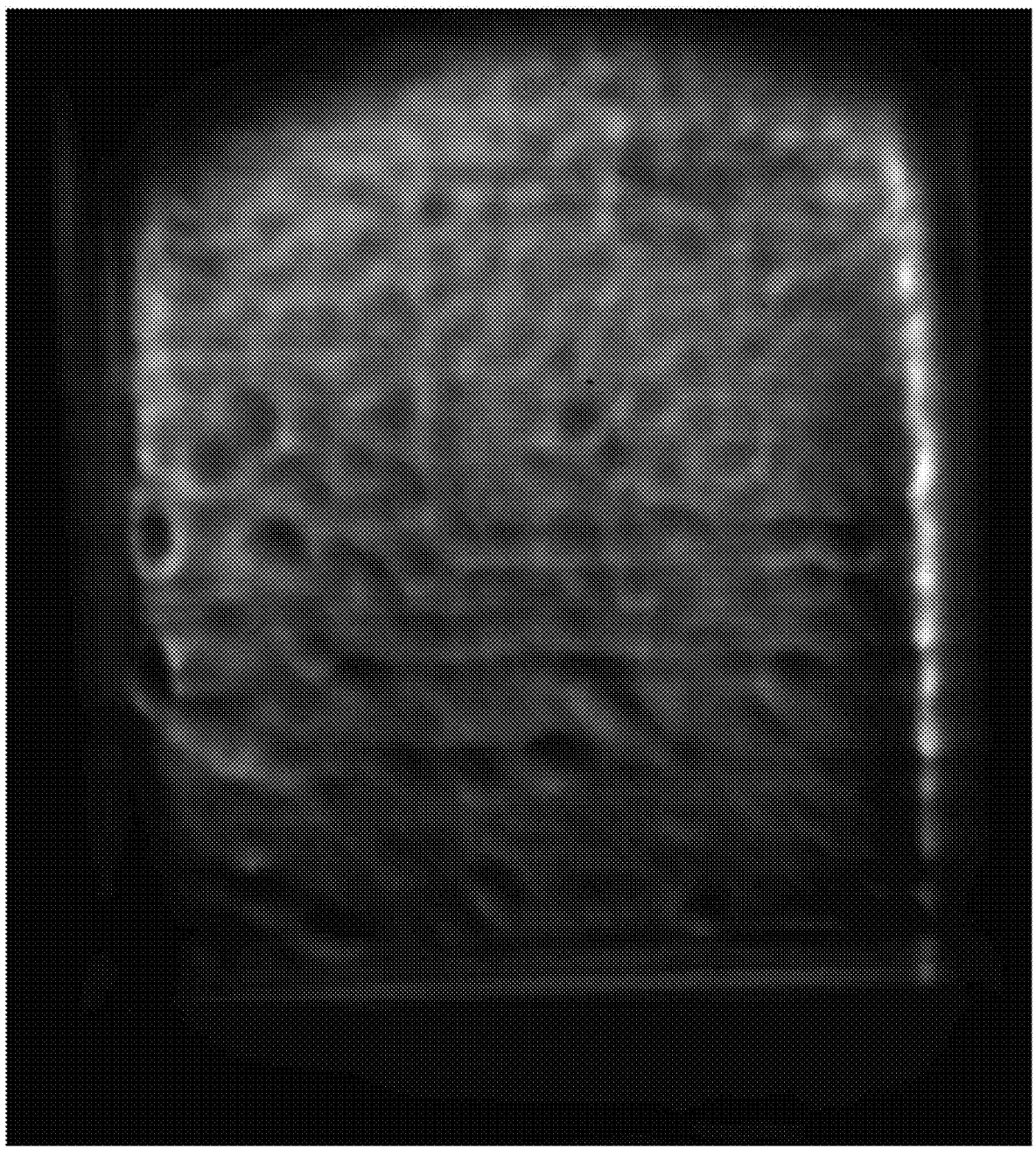
FIG. 28 is an image of an exemplary object (e.g. a touch screen surface) imaged by the vision system camera and illuminator arrangement, with mask, of FIG. 18 showing wavy surface details thereon.
Figure 29:
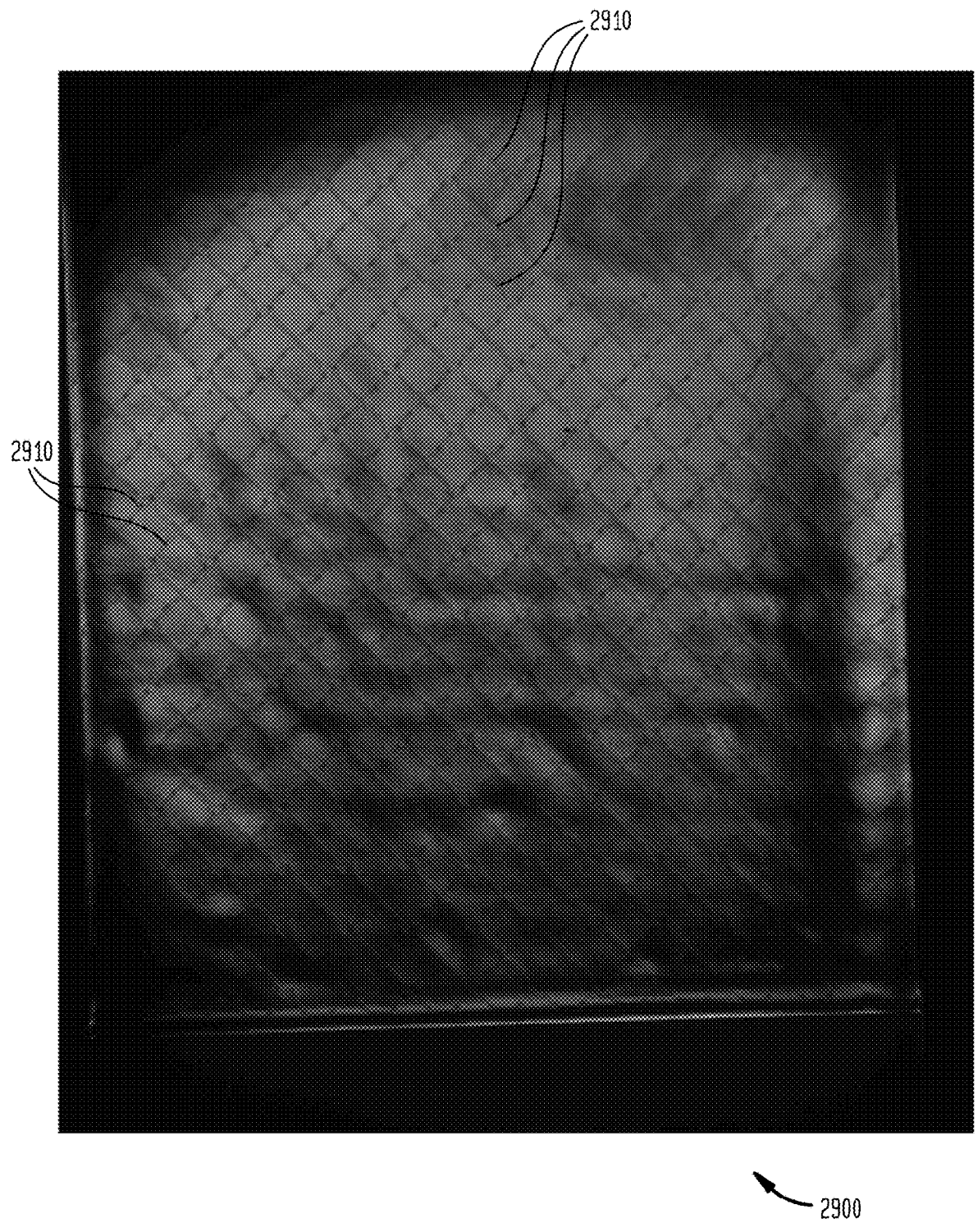
FIG. 29 is an image of the exemplary object of FIG. 28, imaged by the vision system camera and illuminator arrangement of FIG. 18 showing further fine details upon the touch screen surface (e.g. the sensor array)
Figure 30:
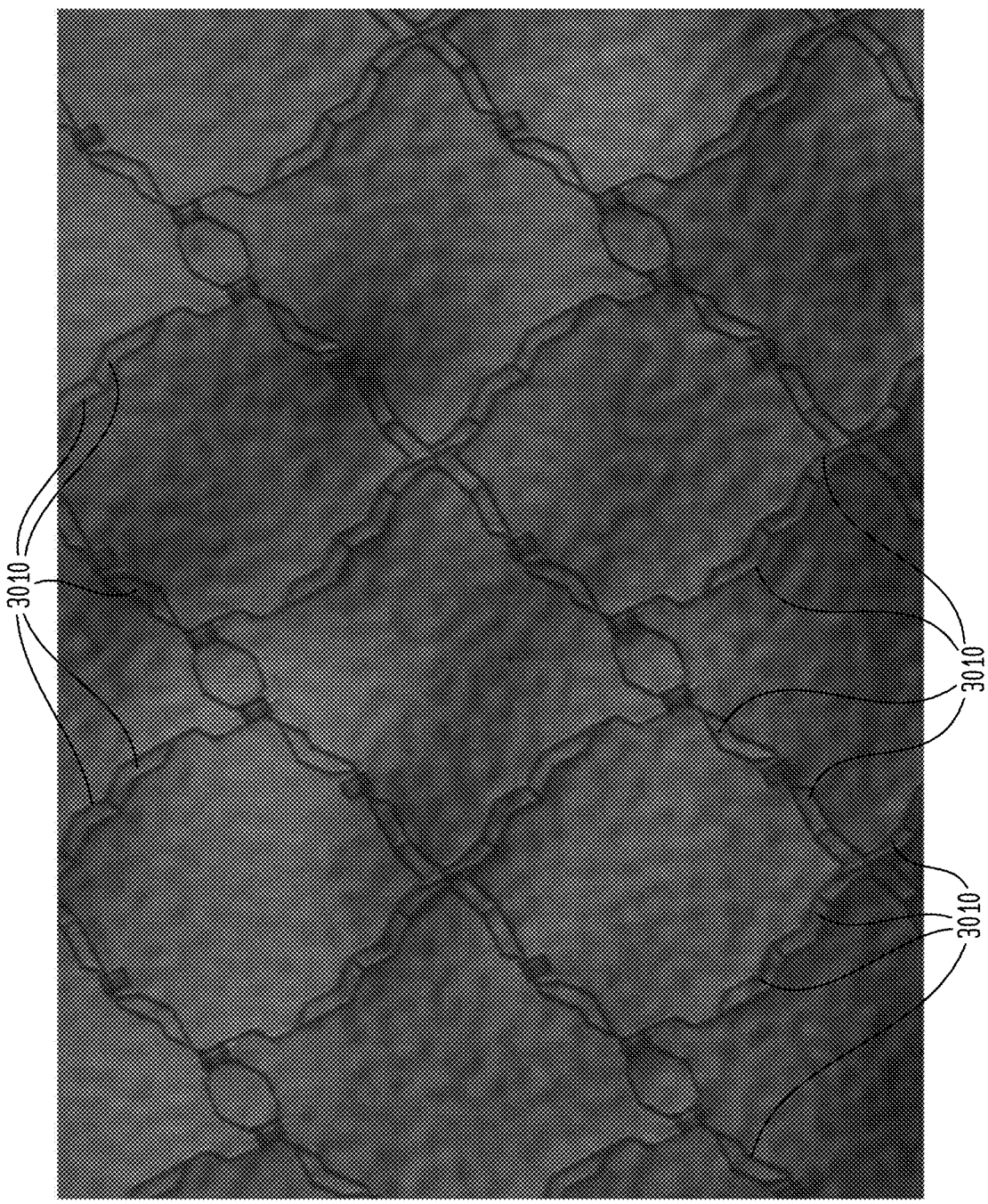
FIG. 30 is and image of the exemplary object of FIG. 28, imaged by the vision system camera and illuminator arrangement of FIG. 28 showing highly accurate details of the sensor array shown in FIG. 29.

With reference to the image 2800 of FIG. 28, a conventional touch screen of a handheld device is shown imaged using a mask according to the above-described embodiments. Surface waviness can be clearly discerned in this image, despite the appearance to the naked eye, or more conventional vision system arrangements, of a relatively flat, featureless surface. In FIG. 29, the image 2900 further shows details not generally visible—in this example, the sensor matrix/array 2910 of the touch screen. The level of detail that can be achieved using the mask and imaging techniques described herein is further shown by way of example in the image of FIG. 30, in which individual wires 3010 of the array 2910 of FIG. 29 are clearly discernable in a close-up view of a region of the touch screen.

VII. Conclusion

It should be clear that the above-described system and method provides an effective technique for identifying slope defects including hill and valley defects and ripple/waviness defects on a variety of layered and unlayered specular surfaces. By applying appropriate wavelengths of illumination light and filters (e.g. various polarizers), the system and method can effectively image surfaces with various coatings and layers. Desirably, the illustrative knife-edge arrangement can discriminate between the slopes (first derivatives) of defects making light reflecting from hills or valleys appear either lighter or darker than the background depending on which side of the defect they are on. The size of a defect is potentially coupled proportionally to the slope of the defect. A small defect would have a small slope and that would deflect the illumination ray a small amount from the background. A small spatial extent in the light source allows it to be brought to a small focus after reflection from the surface under test making it easier to block the background without blocking the defect light. However, a more extended source reduces the negative impact of random test surface tilt that may be encountered in a production environment at the expense of a reduction in defect contrast. Thus, the knife-edge desirably enhances contrast by reducing the background through blocking the background rays. Additionally, the illustrative use of a combination of slope, shape, and polarization detection causes most of the background light is reflected and filtered out of the aperture of the camera while light from sloped defects are focused in high-contrast in the camera. Moreover, the exemplary arrangement allows for wide variation in the size of the specular surface, generally through the use of a line-scan camera and focused illumination line. Embodiments herein also provide a mask that includes a knife-edge element and other elements (e.g. confocal elements) that provide for a highly refined view of certain forms of surface waviness.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein the terms "process" and/or "processor" should be taken broadly to include a variety of electronic hardware and/or software based functions and components (and can alternatively be termed functional "modules" or "elements"). Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Additionally, as used herein various directional and dispositional terms such as "vertical", "horizontal", "up", "down", "bottom", "top", "side", "front", "rear", "left", "right", and the like, are used only as relative conventions and not as absolute directions/dispositions with respect to a fixed coordinate space, such as the acting direction of gravity. Additionally, where the term "substantially" or "approximately" is employed with respect to a given measurement, value or characteristic, it refers to a quantity that is within a normal operating range to achieve desired results, but that includes some variability due to inherent inaccuracy and error within the allowed tolerances of the system (e.g. 1-5 percent). Accordingly, this description is meant to be taken only by way of example, and not to otherwise limit the scope of this invention.

What is claimed is:

1. A system for imaging defects on a specular surface of an object comprising:
   a vision system camera having an image sensor and optics and defining an optical axis, oriented to image the surface;
   an illuminator assembly projecting a structured light beam onto the surface at a predetermined angle that is non-parallel to the optical axis; and
   a knife-edge element associated with the optics that variably occludes part of a maximum field of view of the sensor, wherein the knife-edge element and the predetermined angle are each set so that light projected from the illuminator assembly onto the surface and reflected towards the optics is substantially transmitted onto the sensor from sloped hills and valleys of features on the surface, and light reflected from regions surrounding the sloped hills and valleys is occluded from the sensor by the knife-edge element,
   wherein the knife edge element defines an occulting structure within the optics located on the optical axis, the occulting structure residing on a mask member provided adjacent to a front of the optics, the occulting structure arranged to selectively enhance or suppress scattered light associated with the features, and
   wherein the occulting structure comprises a circular disk approximately centered on the optical axis, the circular disk having a central opaque region having a diameter that is relative to a size of one or more of the features and is configured to block incoming light, the circular disk having an outer transparent region arranged between the central opaque region and an edge of the circular disk and being configured to allow transmission of incoming light.

2. The system as set forth in claim 1 wherein the predetermined angle is associated with a slope of the hills and the valleys.

3. The system as set forth in claim 1 wherein the sensor is a 2D sensor and the object is stationary with respect to the camera.

4. The system as set forth in claim 1 wherein the sensor defines a line scan camera arrangement and the object is in motion with respect to the camera.

5. The system as set forth in claim 4 wherein the illuminator assembly projects a line of illumination onto the surface.

6. The system as set forth in claim 5 wherein the illumination substantially defines an IR or near-IR wavelength range.

7. The system as set forth in claim 6 wherein the object defines layers including an anti-reflective coating.

8. The system as set forth in claim 7 wherein the layers include a polarizing layer, the illumination is polarized and the optics includes a polarized filter.

9. The system as set forth in claim 8 wherein the object is an AMOLED display and the polarizing layer is a $\frac{1}{4}\lambda$ retarder and the polarized filter defines a crossed polarized filter.

10. The system as set forth in claim 5 wherein the illuminator includes a polarizer to polarized illumination and the optics includes a polarizing filter.

11. The system as set forth in claim 1 wherein the illumination source defines a condensed beam that converges toward a point in proximity to the knife-edge element.

12. The system as set forth in claim 1 wherein the illuminator assembly projects light through a beam splitter residing on an optical axis of the vision system camera so that off-axis illumination from the illuminator assembly is projected by the beam splitter onto the object surface coincident with the optical axis.

13. The system as set forth in claim 1 wherein the illuminator assembly defines a plurality of illumination sources each projecting a light into a respective beam splitter, each beam splitter residing on an optical axis of the vision system camera, so that off-axis illumination from each of the illumination sources is projected by the beam splitters, respectively, onto the object surface coincident with the optical axis.

14. The system as set forth in claim 4 wherein the imaging lens defines a lens that images a line and the illuminator assembly projects onto the surface and then focuses to a line, after reflection, that falls outside of the entrance aperture of the imaging lens.

15. The system as set forth in claim 14 wherein the illuminator assembly includes a cylindrical lens to focus the line.

16. The system as set forth in claim 1 wherein the features define waviness on a region of the surface and further comprising an analysis and evaluation process that determines a distribution of pixel intensity values in an image acquired by the image sensor and compares the distribution to a threshold.

17. The system as set forth in claim 16 wherein the distribution is defined by at least one histogram of pixel intensity value versus frequency in the image.

18. The system as set forth in claim 1 further comprising an annular region surrounding the disk and defining an annular aperture therebetween, the annular region being arranged to suppress scattered light.

19. The system as set forth in claim 1 wherein the mask member defines at least one of a snap-on or screw on lens cover, an applique placed over the front of the optics and a variable pattern electro-optical mechanism located on the optics.

20. The system as set forth in claim 1 further comprising a first polarizer located in conjunction with the optics and a second polarizer located in conjunction with the illuminator assembly.

21. The system as set forth in claim 1, wherein the diameter is between 5 and 10 mm.

* * * * *